(12) United States Patent
Nahmias et al.

(10) Patent No.: US 11,143,822 B1
(45) Date of Patent: Oct. 12, 2021

(54) OPTICAL FILTER SYSTEM AND METHOD OF OPERATION

(71) Applicant: Luminous Computing, Inc., Menlo Park, CA (US)

(72) Inventors: Mitchell A. Nahmias, Menlo Park, CA (US); Michael Gao, Menlo Park, CA (US)

(73) Assignee: Luminous Computing, Inc., Menlo Park, CA (US)

( * ) Notice: Subject to any disclaimer, the term of this patent is extended or adjusted under 35 U.S.C. 154(b) by 42 days.

(21) Appl. No.: 16/697,162

(22) Filed: Nov. 26, 2019

Related U.S. Application Data

(60) Provisional application No. 62/771,486, filed on Nov. 26, 2018.

(51) Int. Cl.
*G02B 6/35* (2006.01)
*G02B 6/293* (2006.01)
*G02B 6/02* (2006.01)
*F21V 8/00* (2006.01)
*G02B 6/12* (2006.01)

(52) U.S. Cl.
CPC ......... *G02B 6/3588* (2013.01); *G02B 6/0026* (2013.01); *G02B 6/02052* (2013.01); *G02B 6/29368* (2013.01); *G02B 2006/12109* (2013.01)

(58) Field of Classification Search
None
See application file for complete search history.

(56) References Cited

U.S. PATENT DOCUMENTS

| | | |
|---|---|---|
| 10,009,135 B2 | 6/2018 | Tait et al. |
| 2012/0105177 A1* | 5/2012 | McLaren ............ G02F 1/0147 333/234 |
| 2019/0331912 A1 | 10/2019 | Tait et al. |

OTHER PUBLICATIONS

Djordjevic, Stevan S.et al., "CMOS-compatible, athermal silicon ring modulators clad with titanium dioxide," Opt. Express 21, 13958-13968 (2013).
Georgas, M. et al., "Addressing link-level design tradeoffs for integrated photonic interconnects," in Custom Integrated Circuits Conference (IEEE, 2011), 978-1-4577-0233-5/11.
Koster, U et al. 2017, "Flexpoint: An Adaptive Numerical Format for Efficient Training of Deep Neural Networks," Artificial Intelligence Products Group, Intel Corporation, Dec. 5, 2017, 14 pages.
Krishnamoorthy, Ashok V. et al. "Exploiting CMOS Manufacturing to Reduce Tuning Requirements for Resonant Optical Devices" IEEE Photonics Journal, vol. 3, No. 3, Jun. 2011, 14 pages.
Tait, Alexander N. et al. "Feedback control for microring weight banks," Opt. Express 26, 26422-26443 (2018).
Timurgan, Erman, "An Ultralow power athermal silicon modualor" Nature Communications, DOI: 10.1038/ncomms5008, published Jun. 11, 2014, 11 pages.

* cited by examiner

*Primary Examiner* — Chad H Smith
(74) *Attorney, Agent, or Firm* — Jeffrey Schox; Samuel Rosenthal

(57) ABSTRACT

An optical filter system, preferably including an optical input, one or more sets of filters, and/or a control module. A method for optical filter operation, preferably including operating an optical filter system in a normal mode, assessing filter alignment, and/or shifting filter assignments.

17 Claims, 12 Drawing Sheets

OPTICAL FILTER SYSTEM AND METHOD OF OPERATION

CROSS-REFERENCE TO RELATED APPLICATIONS

This application claims the benefit of U.S. Provisional Application Ser. No. 62/771,486, filed on 26 Nov. 2018, which is incorporated in its entirety by this reference.

TECHNICAL FIELD

This invention relates generally to the optical filter field, and more specifically to a new and useful optical filter system and method of operation.

BACKGROUND

Manufacturing and/or operational factors can cause mismatches between optical signals and the properties of optical filters intended to interact with those signals. For example, changes in temperature can cause filter resonance wavelengths to shift away from the wavelength-delimited channels they are designed to filter, which can require the use of energy-intensive heating elements to compensate for these shifts. M. Georgas et al., "Addressing link-level design tradeoffs for integrated photonic interconnects," in Custom Integrated Circuits Conference (IEEE, 2011), 978-1-4577-0233-5/11, propose an electrical backend for managing channel assignments associated with rings used for digital binary filtering, wherein each ring is configured to filter light of the assigned wavelength channel by either entirely transmitting or entirely blocking the light of that channel. However, this proposed electrical backend has several limitations. Thus, there is a need in the optical filter field to create a new and useful optical filter system and method of operation.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. System.

Figure 1A:
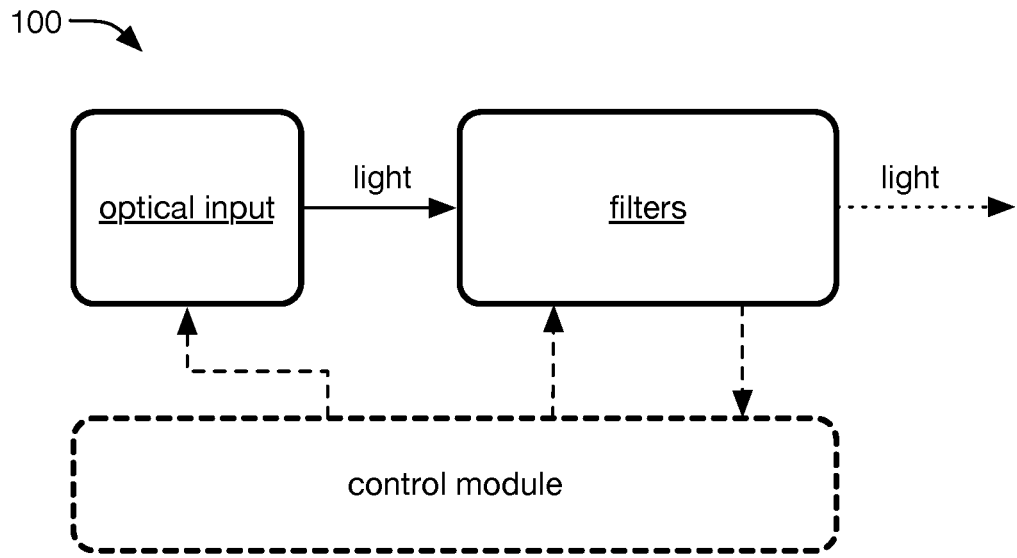
FIGS. 1A-1B are schematic representations of an embodiment of the system and an example of the embodiment, respectively.
Figure 1B:
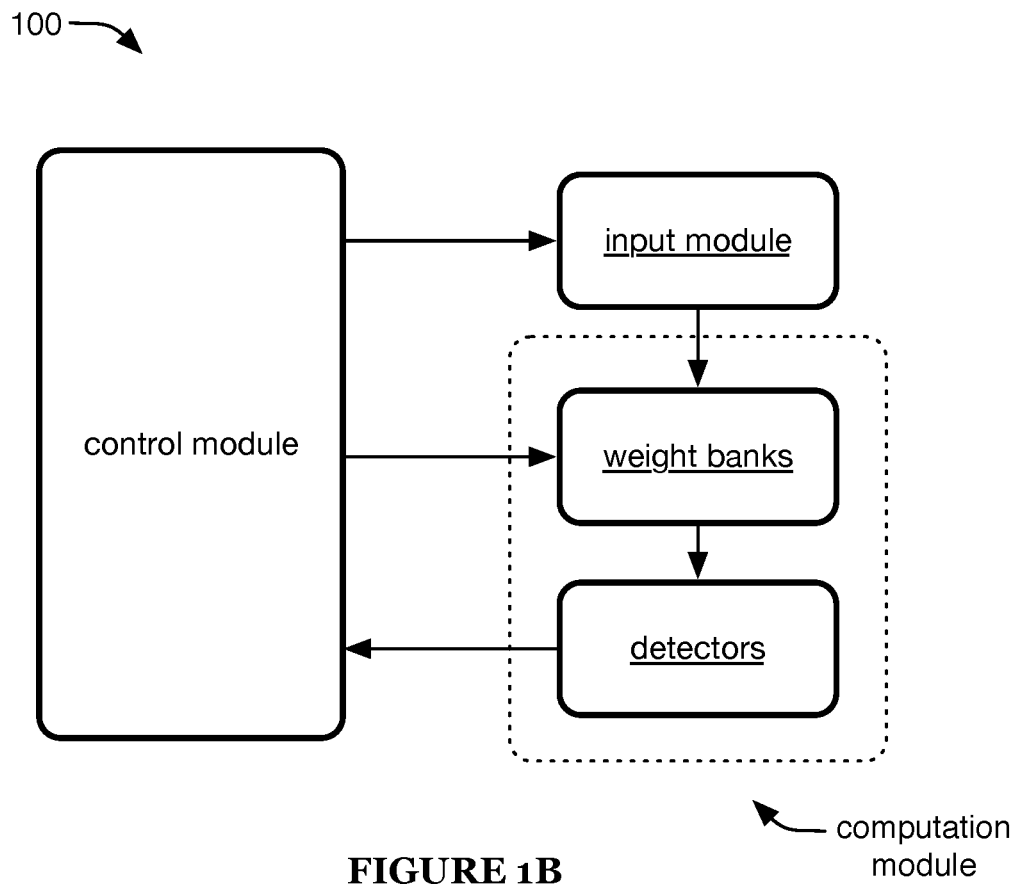

An optical filter system 100 preferably includes an optical input, one or more sets of filters, and/or a control module (e.g., as shown in FIG. 1A). The system 100 preferably functions to filter one or more optical signals, more preferably to perform photonic computations, but can additionally or alternatively perform any other suitable function(s).

The optical input preferably functions to provide a multi-wavelength (e.g., WDM) input signal (e.g., a photonic representation of an input signal). The optical input preferably includes one or more transducers (e.g., emitters, such as a laser array; preferably transducers such as described below regarding the input module, but additionally or alternatively any other suitable transducers). Additionally or alternatively, the optical input can include (e.g., be, be contributed to by, etc.) the output (e.g., optical output) from one or more other optical filter systems (e.g., of other photonic computing modules); such outputs can be delivered directly as inputs to the optical filter system, can be intermediated by one or more remodulators (e.g., that receive the optical output, transduce it into an electrical signal, optionally transform the electrical signal, and then generate an optical signal based on it, which is delivered as the optical input), and/or can be handled in any other suitable manner. The optical input preferably defines a plurality of wavelength channels, preferably wherein each emitter emits at a different wavelength channel. For example, each emitter can emit within a different emission channel near (e.g., within a threshold distance of, substantially centered around, etc.) the 1.3 micron and/or 1.55 micron wavelength (e.g., within the 1.26-1.36 micron O-band, within the 1.53-1.565 micron C-band and/or the 1.565-1.625 micron L-band, etc.), wherein the wavelengths described herein preferably refer to the wavelength the light would have in free space, rather than to the wavelength of the light in the medium through which it is propagating. The wavelength channels are preferably narrow-band channels, such as channels of less than a threshold bandwidth (e.g., 1, 2, 3, 5, 6, 8, 10, 15, 25, 40, 65, 100, 200, 500, 1000, 1-5, 3-8, 5-10, 10-20, 20-100, 100-300, and/or 300-1000 GHz frequency bandwidth; 0.01, 0.02, 0.05, 0.1, 0.2, 0.5, 1, 2, 5, 10, 0.01-0.05, 0.05-0.2, 0.2-1, 1-3, or 3-10 nm spectral bandwidth; etc.), but can additionally or alternatively include intermediate- and/or wide-band channels and/or channels of any other suitable widths. The emitted and/or modulated light preferably has a bandwidth significantly narrower than the width of the associated channel, such as narrower by at least a threshold relative amount (e.g., less than 0.01, 0.03, 0.1, 0.2, 0.3. 0.4, 0.5, 0.001-0.01, 0.01-0.1, 0.1-0.3, 0.3-0.5, or more than 0.5 times the width of the associated channel, etc.) and/or absolute amount (e.g., 0.1, 0.2, 0.5, 1, 2, 5, 10, 15, 20, 30, 40, 50, 75, 100, 150, 250, 0.1-1, 1-5, 5-15, 15-45, 45-100, or 100-300 GHz, etc.), more preferably wherein the light is farther than a threshold amount (e.g., 0.25-1 times the threshold amounts described above) from either edge of the associated channel. The emitted and/or modulated light is preferably substantially centered within the associated channel (e.g., within a threshold amount of the center, such as 0.25-1 times the threshold amounts described above), but can alternatively be located at any other suitable location within the channel. The emitted light, and preferably also the modulated light (e.g., including some modulation sidebands, such as sidebands with greater than a threshold intensity and/or substantially any sidebands), of any emitter is preferably contained (or substantially contained) within a single such channel (but can alternatively span multiple channels). In one example, the emitted light has a linewidth less than a first threshold amount (e.g., 0.3, 1, 3, 10, 30, 100, 300, 1000, 3000, 0.3-3, 3-300, and/or 300-10,000 MHz, etc.), and/or the modulated light (e.g., modulated by a signal of 0.1-30 GHz, such as 3 GHz) occupies less than a second threshold amount of spectrum (e.g., 0.1, 0.2, 0.5, 1, 2, 3, 5, 6, 8, 10, 30, 100, 0.1-0.3, 0.3-1, 1-3, 3-8, 8-20, and/or 20-100 GHz, etc.). However, the emitted and/or modulated light can additionally or alternatively occupy any other suitable amount of the spectrum.

The channels are preferably non-overlapping, more preferably having at least (and/or at most) a threshold channel spacing (e.g., threshold amount relative to the channel width, such as 5, 10, 25, 50, 100, 110, 125, 150, 175, 200, 250, 300, 400, 500, 0-1,1-5, 5-15, 15-30, 30-60, 60-100, 100-110, 110-120, 120-150, 150-200, 200-300, or 300-500% of the channel width; absolute threshold amount, such as 0.1, 0.2, 0.5, 1, 2, 5, 10, 15, 20, 30, 40, 50, 75, 100, 150, 250, 0.1-1, 1-5, 5-15, 15-45, 45-100, or 100-300 GHz; etc.) between each other (e.g., center-to-center distance, edge-to-edge distance, etc.). However, all or some of the channels can alternatively be overlapping (e.g., by no more and/or no less than a threshold amount, such as described above regarding the threshold spacing) and/or have any other suitable relationship to each other. The channel spacing (between adjacent channels in wavelength space) is preferably substantially uniform (e.g., within a threshold amount of each other or defining a distribution with a standard deviation within a threshold amount, such as within 1, 2, 5, 10, 15, or 20% of the average channel spacing). The channels and/or emitters can be indexed based on wavelength (e.g., from shortest to longest wavelength, such as channel 1 being associated with the shortest wavelength, channel 2 being associated with the second shortest wavelength, etc.), wherein consecutively-indexed channels are adjacent in wavelength space (e.g., for any two channels whose indices differ by 1, no other channel has a wavelength between the wavelengths of those two channels). The channels can additionally or alternatively be associated with optical modes (e.g., transverse spatial modes, polarization modes, etc.) and/or any other suitable optical characteristics. Alternatively, a single transducer can control multiple emission channels, and/or the transducers can emit light of any other suitable wavelength(s) and/or other optical characteristics. Each channel preferably corresponds to a different element of the input vector.

The filters (e.g., wavelength-selective optical filters) preferably function to filter the optical input signal. The filters are preferably wavelength-selective optical filters (e.g., substantially filtering only a narrow wavelength band, such as substantially filtering only light of a single channel). For example, each filter can have a width (e.g., FWHM) equal to, less than (e.g., by a threshold amount, such as by a factor of 0.5, 0.75, 0.85, 0.9, 0.95, 0.99, 0.5-0.8, 0.8-0.95, or 0.95-1, etc.), or greater than (e.g., by a threshold amount, such as by a factor of 1, 1.05, 1.1, 1.15, 1.25, 1.5, 2, 1-1.1, 1.1-1.25, or 1.25-2, etc.) the width of the associated channel. The wavelength-selective optical filters are preferably microresonators (e.g., more preferably microdisk resonators, but additionally or alternatively including microring resonators, photonic crystal defect state filters, etc.). The optical filter can optionally be embedded in one or more other structures, such as a resonator and/or Mach-Zehnder interferometer (MZI), which can function to enhance its modulation performance and/or alter the modulation mechanism. In some variations, the optical filter includes multiple microresonators (e.g., as described in Alexander N. Tait, Allie X. Wu, Thomas Ferreira de Lima, Mitchell A. Nahmias, Bhavin J. Shastri, and Paul R. Prucnal, "Two-pole microring weight banks," Opt. Lett. 43, 2276-2279 (2018), which is hereby incorporated in its entirety by this reference). In some variations, the optical filter includes multiple filters and/or modulators coupled together using inverse design (e.g., as described in Weiliang Jin, Sean Molesky, Zin Lin, Kai-Mei C. Fu, and Alejandro W. Rodriguez, "Inverse design of compact multimode cavity couplers," Opt. Express 26, 26713-26721 (2018), which is hereby incorporated in its entirety by this reference). However, the system can additionally or alternatively include any other suitable optical filters. Although referred to herein as optical filters, a person of skill in the art will recognize that the filters can additionally or alternatively include optical switches, optical modulators, and/or any other suitable elements.

Figure 2A:
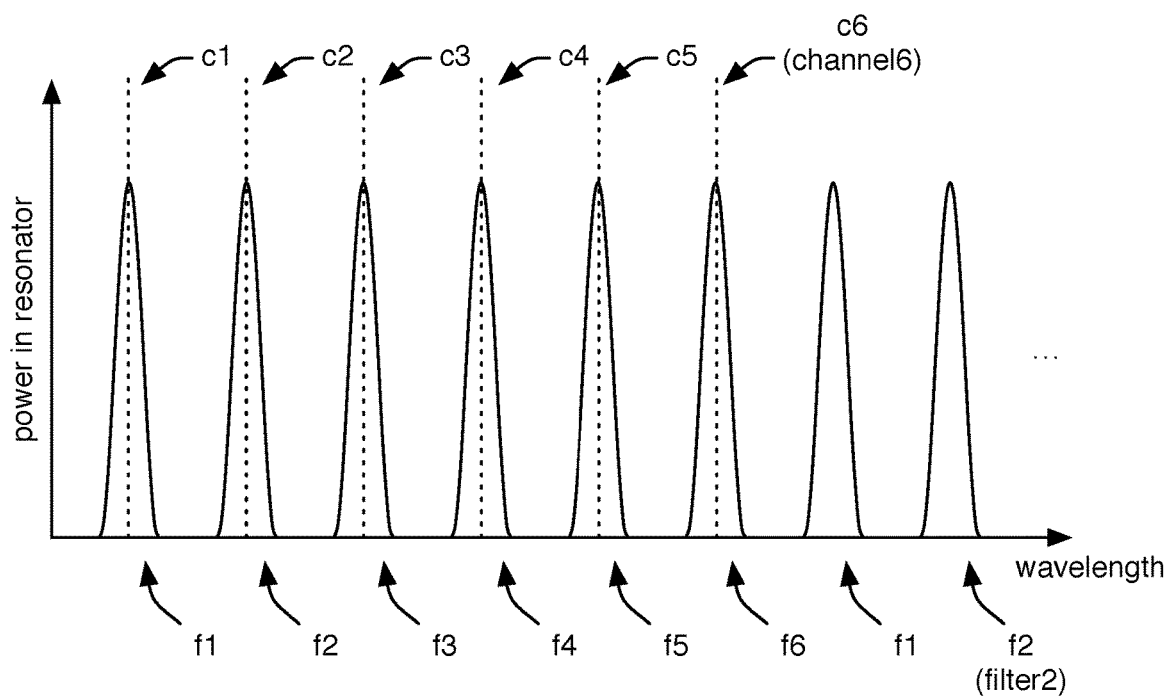
FIGS. 2A-2D are representations of optical channels and filter resonances of an example of the system.

In addition to the optical element itself (e.g., the microresonator), each filter preferably includes (and/or is associated with) a control element (e.g., feedback element). For example, the control element can include a filter driver, a detector, and/or a feedback controller. The filters are preferably organized into one or more sets (e.g., one or more spectral filter banks, such as weight banks and/or input signal filter banks, etc.). Preferably, each set includes the same number of filters as the number of channels (e.g., emitters) in the system. Each filter of a set preferably has a different resonance wavelength (e.g., resonance wavelength under fixed conditions, such as a typical operating temperature and a predetermined applied voltage, such as a filter-specific voltage or a voltage consistent across all filters, such as no applied voltage, etc.). Preferably, each resonance wavelength corresponds to (e.g., is within, such as substantially centered within) a different wavelength channel (e.g., as shown in FIG. 2A); accordingly, the spacing (e.g., average spacing) between filter resonances is preferably similar to (e.g., equal to or substantially equal to, within 1, 2, 5, 10, or 20% of, etc.) the channel spacing (e.g., average channel spacing). Alternatively, the system can include additional filters (e.g., unassigned filters, such as filters with resonances between the assigned filters) and/or any other suitable number of filters with any suitable resonances (e.g., wherein the filter resonance spacing differs from the channel spacing). The filters can be indexed based on their resonance wavelength (e.g., primary resonance wavelength, resonance wavelength closest to a reference wavelength such as the central band wavelength, etc.), preferably in the same manner as the channel or emitter indexing (e.g., from the shortest wavelength to the longest wavelength). The filters are preferably tunable (e.g., in response to inputs from the control element, such as electrical control signals), such as wherein the filter resonance wavelength (and/or any other suitable filter properties) changes in response to applied stimuli (e.g., electrical stimuli, such as applied voltage and/or current). In a first example, a control voltage is applied to a filter using a forward-biased diode (e.g., which can exhibit substantially constant quiescent power use). In a second example, a control voltage is applied to a filter using a reverse-biased diode (e.g. in a capacitive arrangement), which can exhibit activity-dependent energy consumption (e.g., thereby enabling superior power efficiency in some circumstances). The filters can additionally or alternatively be configured to be tuned using one or more temperature control elements (e.g., as described below), such as wherein a temperature control element is configured to be controlled by the control element (and/or a second control element, such as a temperature-specific control element). However, the filters can additionally or alternatively be configured to be tuned in any other suitable manner.

Figure 2B:
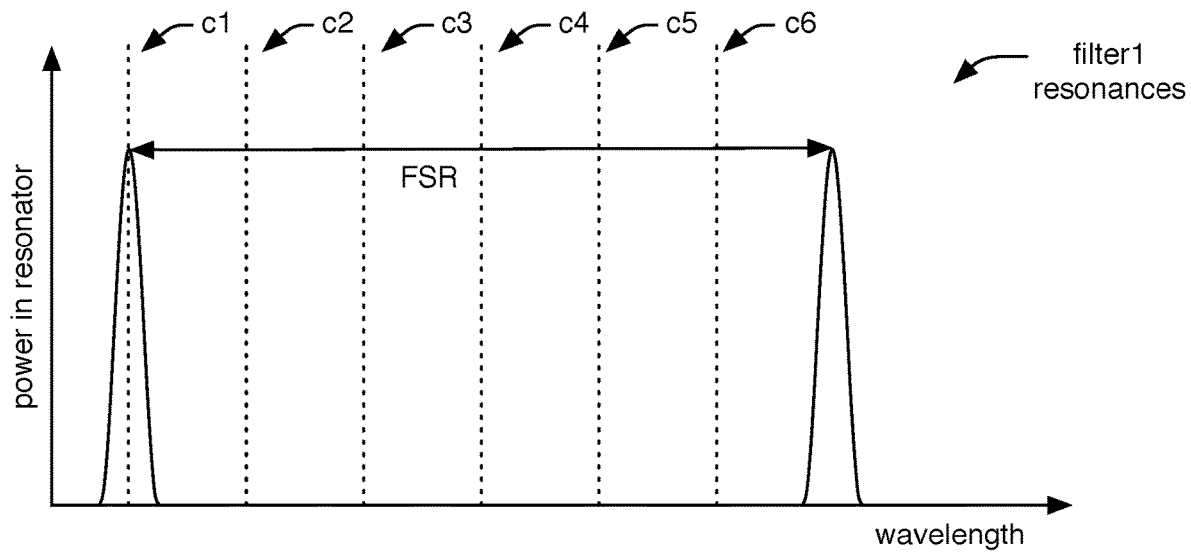
Figure 2C:
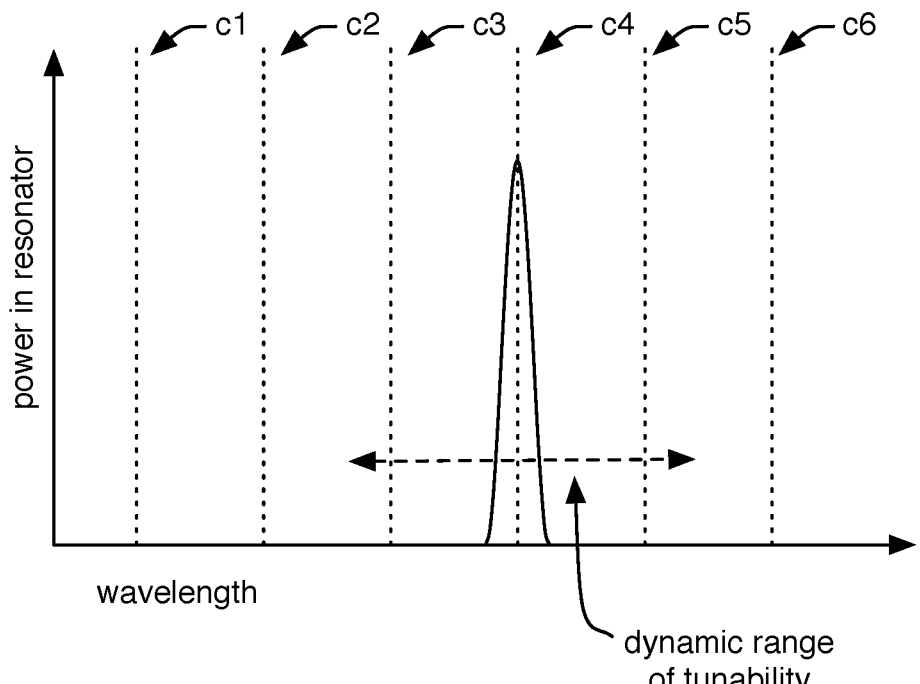
Figure 2D:
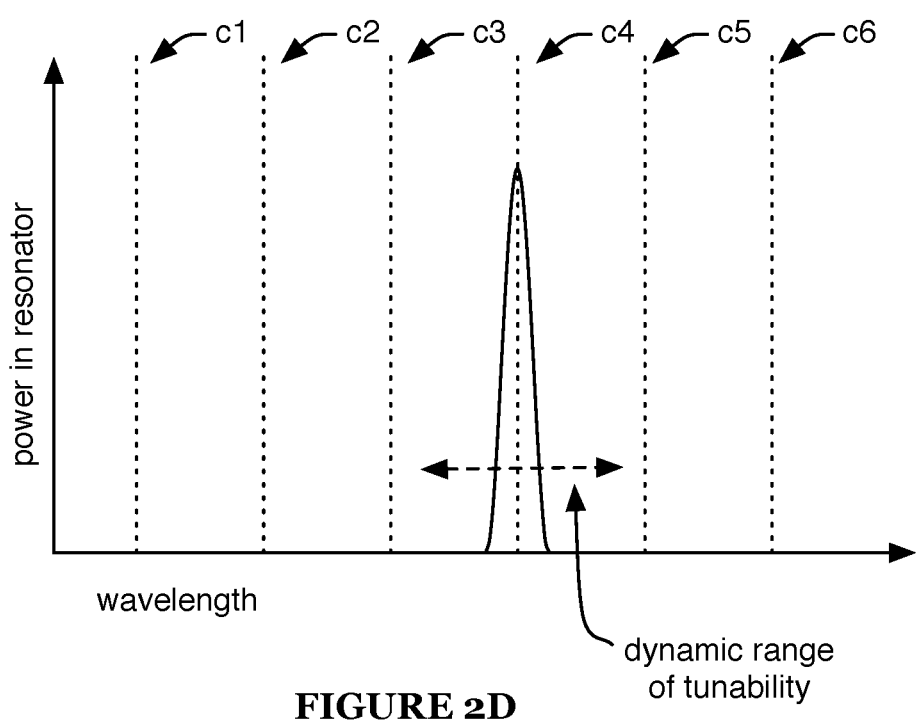

Each filter can optionally have multiple resonances. Preferably, the free spectral range (FSR; e.g., range between resonances) of each filter is greater than the total spectral bandwidth of the WDM signal, such that only one resonance of each filter falls within the WDM band (e.g., band defined by the modulated signals, such as the minimum band that spans all the channels), and thus that filter interacts substantially with the WDM signal only within that resonance (e.g., as shown in FIGS. 2A-2B). In some embodiments, the spacing between resonances (e.g., under fixed conditions) of the different filters is substantially maintained (e.g., approximately equal) for more than one such resonance (e.g., the FSR is approximately equal to the product of the spacing between filters and the number of filters in the set), such that the resonances of the set of filters define a substantially regular array of resonances with number much greater than the number of filters of the set. The dynamic range of tunability (e.g., the range of the resonance wavelength shift over a desired control signal range, such as 1V) of each filter is preferably greater than (or substantially equal to) a threshold amount (e.g., as shown in FIGS. 2C-2D), but can alternatively be less than the threshold amount. The threshold amount is preferably greater than 150% or 200% of the channel spacing (e.g., the spacing between resonances of the different filters, such as 2, 5, 10, 20, 50, 100, 200, 1-3, 3-10, 10-30, 30-100, or 100-300 GHz, etc.), more preferably greater by an amount sufficient to compensate for fabrication variance (e.g., an additional 5, 10, 15, 20, 25, 30, 35, 50, 75, 100, 0-3, 3-10, 10-20, 20-50, 50-100, or greater than 100% of the channel spacing; an additional 5, 10, 15, 20, 25, 30, 35, 40, 50, 75, 100, 0-3, 3-10, 10-20, 20-50, 50-100, or greater than 100 GHz; etc.), which can result in filter resonance wavelengths different from the specified values. For example, the threshold amount can be 160-170, 170-185, 185-200, 200-225, 225-250, 250-300, or greater than 300% of the channel spacing. However, the threshold amount can alternatively be less than 150% of the channel spacing (e.g., 100-150% of the channel spacing), less than the channel spacing (e.g., 50-100% of the channel spacing), and/or any other suitable amount.

Figure 3A:
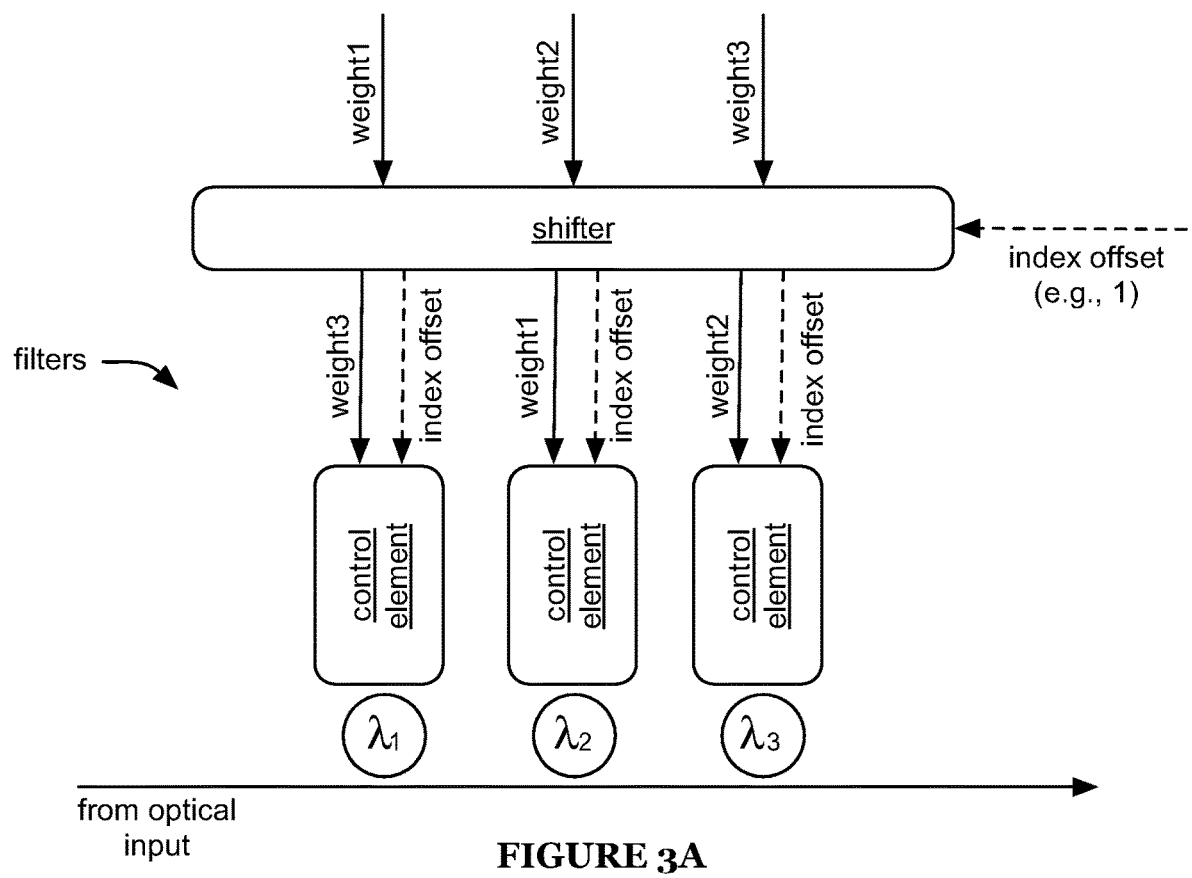
FIG. 3A is a schematic representation of an embodiment of a filter set.
Figure 3B:
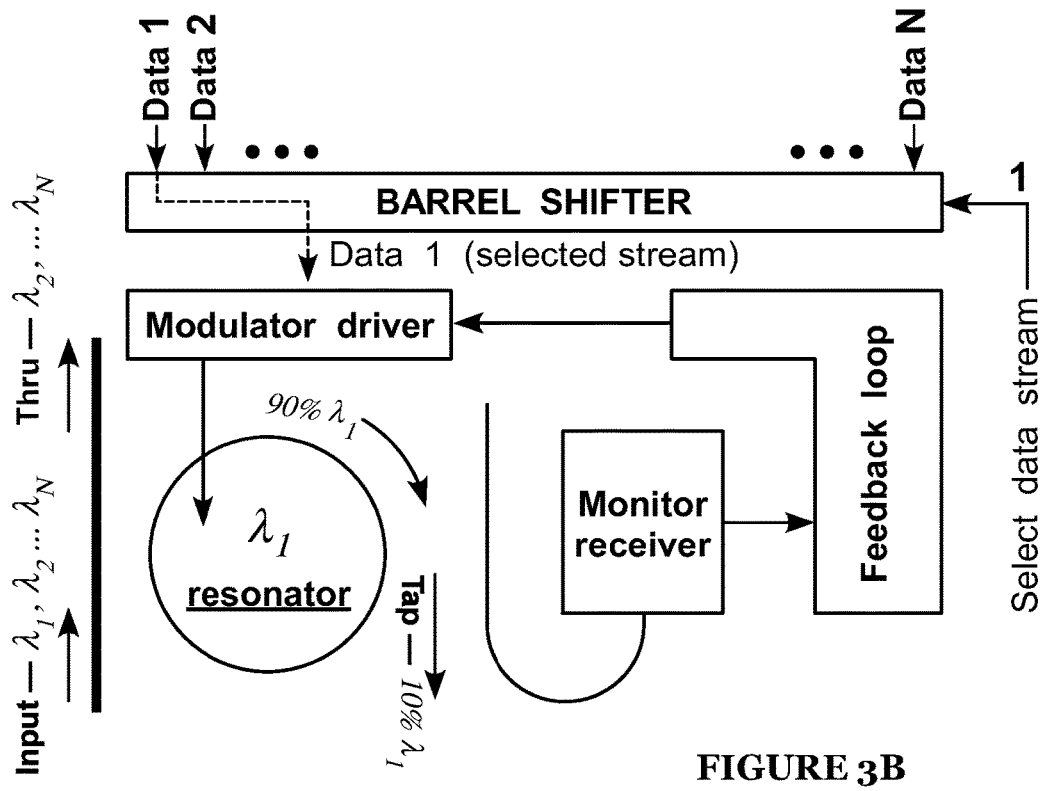
FIG. 3B is a schematic representation of an example of a filter.

The filters of a set (e.g., spectral filter bank) are preferably arranged spatially close to each other and/or are otherwise thermally coupled (e.g., having approximately the same temperature as each other during system operation). For example, the filters of a set can be arranged in a boustrophedon, spiral, and/or any other suitable pattern. Each set of filters preferably includes (and/or is otherwise associated with) a shifter (e.g., as shown in FIGS. 3A-3B), such as a barrel shifter. For example, the system can include one or more filters, barrel shifters, and/or feedback elements such as described in E. Timurdogan, C. M. Sorace-Agaskar, J. Sun, E. Shah Hosseini, A. Biberman, and M. R. Watts, "An ultralow power athermal silicon modulator", Nat. Commun. 5, 4008 (2014), which is hereby incorporated in its entirety by this reference. Each filter is preferably associated with a single shifter, but can alternatively be associated with multiple shifters. Each shifter is preferably associated with a single set of filters (e.g., associated with all filters of the set), but can additionally or alternatively be associated with multiple sets of filters (e.g., multiple weight banks), all filters of the system, a single filter, and/or any other suitable subset(s) of the filters.

The system can optionally include one or more temperature control elements (e.g., heating elements, cooling elements, etc.). For example, the system can include active heating and/or cooling elements (e.g., resistive heaters, thermoelectric devices, etc.) configured to control and/or otherwise affect the temperature of one or more elements of the system (e.g., the filters). However, such active elements can require significant power to operate, which may detrimentally increase the overall power consumption of the system. Thus, embodiments of the system may not include such elements, and/or may minimize the use of such components (e.g., to minimize the associated power consumption).

The control module preferably functions to control operation of and/or receive outputs from the other elements of the system, such as the optical input and/or the filters. The control module can include, for example, one or more processors, preferably electronic processors (e.g., CPU, GPU, microprocessor, FPGA, ASIC, etc.), storage elements (e.g., RAM, flash, magnetic disk drive, etc.), serializers, deserializers, digital to analog converters (e.g., which can function to generate data signals and/or control signals for the optical input, filters, and/or other controlled elements), analog to digital converters, and/or any other suitable elements.

In some embodiments, the system includes an input module (e.g., including the optical input, and optionally including one or more of the sets of filters, such as functioning as the input modulators described below) and/or computation module (e.g., including one or more of the sets of filters, such as defining the spectral filter banks described below).

The input module preferably functions to generate a photonic representation of an input signal. In some embodiments, the input signal is representative of an input vector (e.g., encodes the input vector). Additionally or alternatively, the input signal can be representative of other information (e.g., for links between elements of the system 100 and/or between the system 100 and other photonic modules), such as encoding analog information (e.g., using pulse-amplitude modulation, such as PAM-16 and/or PAM of any other suitable level(s); using quadrature amplitude modulation; etc.), encoding digital information (e.g., using binary modulation such as on-off modulation), and/or encoding any other suitable information. The input module preferably includes one or more transducers and optionally includes one or more multiplexers, and can additionally or alternatively include any other suitable elements.

The transducers preferably function to control light transmission and/or emission at various wavelengths. The input module preferably includes a plurality of transducers. Each transducer preferably controls a different emission channel (e.g., wavelength channel, mode channel, etc.), such as the channels described above.

The transducer preferably couples light into one or more structures (e.g., on a chip), such as waveguides. The transducer is preferably an optical transducer, more preferably an electro-optical transducer (e.g., which outputs lights based on an electrical input), but can additionally or alternatively be any other suitable transducer. For example, the input module can include one or more input elements (e.g., elements of the optical multiplexer, lasers and/or modulators thereof, etc.) such as described in U.S. Pat. No. 8,027,587, issued Sep. 27, 2011 and titled "Integrated Optic Vector-Matrix Multiplier", which is hereby incorporated in its entirety by this reference.

In one embodiment, each transducer includes an emitter and an amplitude modulator. The input module can additionally or alternatively include multiple transducers that receive light from a shared emitter, such as wherein the shared emitter emits light (e.g., unmodulated or substantially unmodulated light) corresponding to multiple optical channels (e.g., multiple wavelength channels). The emitter is preferably a laser (e.g., diode laser, preferably a component of an integrated circuit), such as a distributed feedback (DFB) laser, a distributed Bragg reflector (DBR) laser, a Fabry Perot (FP) cavity laser (e.g., with multiple modes, thereby outputting light of multiple wavelengths) such as a quantum dot- and/or quantum well-based FP cavity laser, an external cavity laser, a mode-locked laser (e.g., gain-absorber system) configured to output light of multiple wavelengths, an optical frequency comb (OFC), and/or a vertical cavity surface emitting laser, but can additionally or alternatively include an LED and/or any other suitable light emitter. In some examples, the emitter (e.g., DFB laser emitting a single wavelength, DBR laser emitting multiple wavelengths, etc.) can be coupled to (output light to) one or more modulators (e.g., Mach-Zehnder modulators, resonator modulators, etc.), wherein the modulators are driven by one or more time-varying (e.g., oscillating) signals, thereby generating additional optical channels. In some examples, the emitter (e.g., DFB laser emitting a single wavelength, DBR laser emitting multiple wavelengths, etc.) can be coupled to (output light to) one or more nonlinear optical elements (e.g., silicon nitride ring exhibiting nonlinear optical effects). The transducer preferably includes one amplitude modulator for each emitter and/or each channel. The amplitude modulator is preferably an optical modulator, but can additionally or alternatively be an emitter modulator (e.g., of a directly-modulated emitter, such as a directly-modulated laser) or any other suitable modulator.

Figure 8A:
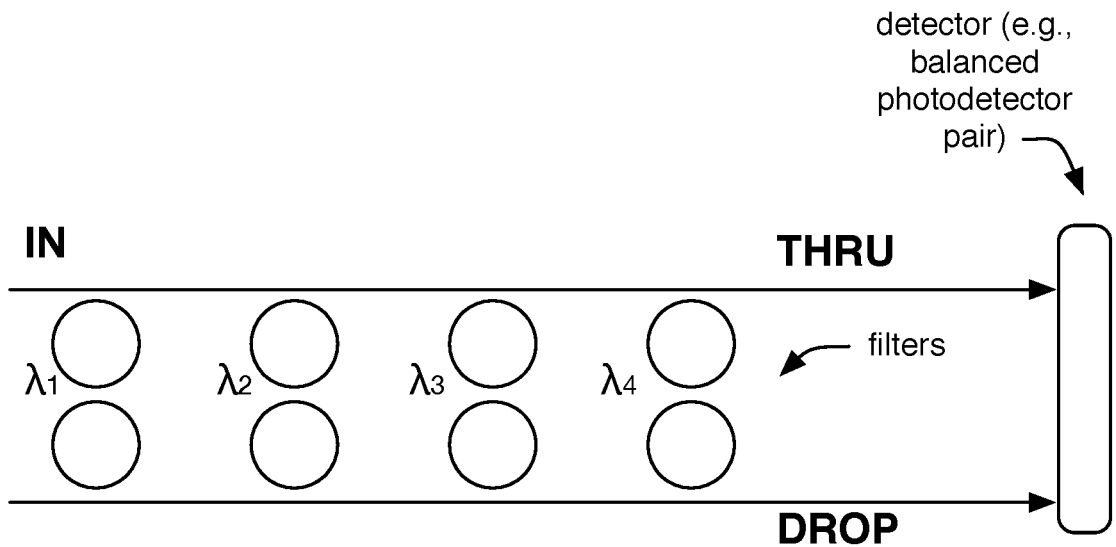
FIGS. 8A-8B are schematic representations of a first and second example, respectively, of a spectral filter bank.

The optical modulator preferably functions to modulate light emitted by an emitter (or multiple emitters). The optical modulator is preferably wavelength-selective (e.g., substantially modulating only a narrow wavelength band, such as substantially modulating only light of a single channel), but can alternatively be a wideband modulator and/or have any other suitable wavelength dependence. The optical modulator can be electro-absorptive and/or electro-refractive. The optical modulator can optionally be embedded in one or more other structures, such as a resonator and/or Mach-Zehnder interferometer (MZI) (e.g., which can function to enhance its modulation performance). In examples, the optical modulator can include one or more microresonators (e.g., microring resonator, microdisk resonator, photonic crystal defect state modulator), quantum confined Stark effect (QCSE) modulator, Zeno effect modulator (e.g., graphene based modulator, such as a silicon photonic graphene modulator), MZI modulator, electro-absorptive modulator embedded in a critically coupled resonator (e.g., QCSE microdisk modulator), photonic crystal-based modulator, and/or any other suitable optical modulator. The optical modulator (e.g., wideband modulator) can optionally be embedded in and/or in series (along the optical path) with one or more filters (e.g., spectral filters), such as an electro-absorptive modulator preceded (along the optical path) by a first filter and followed by a second filter. In some variations, the optical modulator includes multiple microresonators (e.g., as described in U.S. patent application Ser. No. 16/374,991, filed Apr. 4, 2019 and titled "Photonic Filter Bank System and Method of Use", which is hereby incorporated in its entirety by this reference; as shown in FIG. 8A; etc.). The optical modulators can additionally or alternatively include mode modulators (e.g., as described in Lian-Wee Luo, Noam Ophir, Christine P. Chen, Lucas H. Gabrielli, Carl B. Poitras, Keren Bergmen, and Michal Lipson, "WDM-compatible mode-division multiplexing on a silicon chip," Nat. commun. 5, 3069 (2014), which is hereby incorporated in its entirety by this reference). In some variations, the optical modulator includes multiple filters and/or modulators coupled together using inverse design (e.g., as described in Molesky, S., Lin, Z., Piggott, A. Y. et al., "Inverse design in nanophotonics,"Nat. photon. 12, 659-670 (2018), which is hereby incorporated in its entirety by this reference). However, the system can additionally or alternatively include any other suitable optical modulators, or include no such modulators.

The emitter modulator can function to control light emission from the emitter (or from multiple emitters). For example, the emitter modulator can provide an electrical signal that drives the associated emitter, or there can be no emitter modulator, wherein the input signal (e.g., electrical signal, such as from the control module) directly drives the emitter. For example, the transducer can be a laser device. In a first specific example, the laser includes a directly-driven laser modulator. In a second specific example, the modulated laser gain medium can be an active optical semiconductor, which can act as a subthreshold temporal integrator with time-constant equal to carrier recombination lifetime. In this specific example, the laser device itself can act as a threshold detector, rapidly dumping energy stored in the gain medium into the optical mode when the net gain of the cavity crosses unity (e.g., similar to a passively Q-switched laser biased below threshold). However, the input modulator can additionally or alternatively include any other suitable emitter modulator(s), and/or any other suitable modulators of any kind(s).

The transducers can additionally or alternatively include any other suitable elements. The transducers of the input module can be substantially the same as each other (e.g., aside from emitting at and/or modulating different wavelengths), or can be different from one another.

The multiplexer preferably functions to combine multiple optical signals (e.g., channels) onto a single output path (e.g., a waveguide), such as for wavelength-division multiplexing (WDM), but can additionally or alternatively perform any other suitable functions. The multiplexer is preferably an optical multiplexer, such as a multiplexer including one or more filter arrays (e.g., including elements such as gratings and/or circulators). In one example, the multiplexer is an arrayed waveguide grating (AWG). However, the multiplexer can additionally or alternatively be any other suitable multiplexer.

Figure 4A:
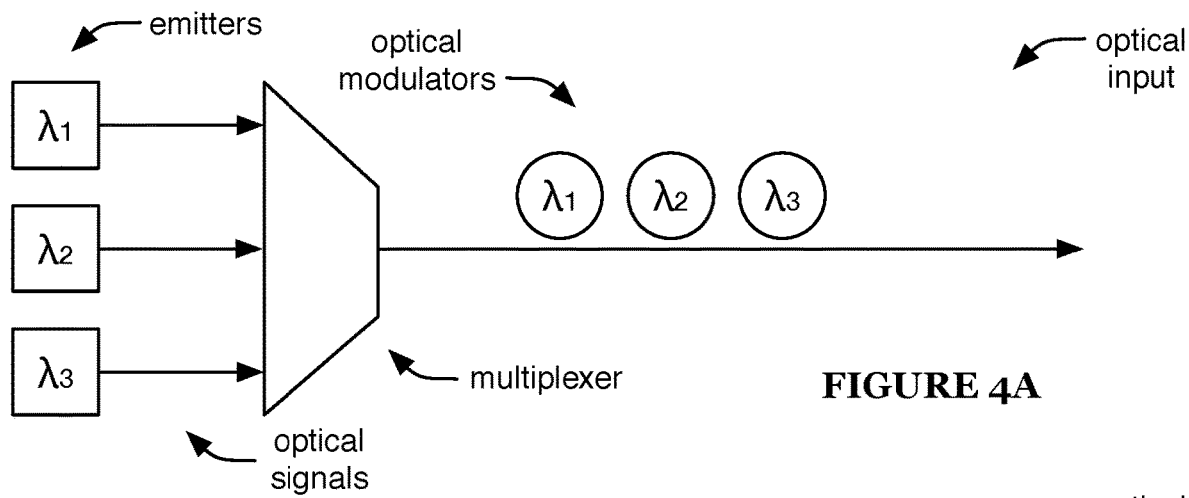
FIGS. 4A-4C are schematic representations of a first, second, and third embodiment, respectively, of the input module.

In a first embodiment of the input module, modulators (preferably wavelength-selective modulators, such as microresonators) alter a multiplexed signal (e.g., as shown in FIG. 4A). Preferably, each wavelength-selective modulator alters a single signal, wherein the other signals (e.g., wavelengths) pass through and/or by the modulator substantially unaltered. Additionally or alternatively, some or all of the modulators can substantially affect more than one of the signals. In a first example of this embodiment, signals (e.g., unmodulated signals) from multiple emitters (e.g., single-channel emitters, few-channel emitters such as single-wavelength multi-mode emitters, many-channel emitters such as comb sources, etc.) are combined by a multiplexer to form the multiplexed signal, which is then preferably provided to the modulators. In a second example, a multi-channel emitter (e.g., multi-wavelength emitter such as a comb source) generates the multiplexed (but preferably unmodulated) signal, which is then preferably provided to the modulators.

Figure 4B:
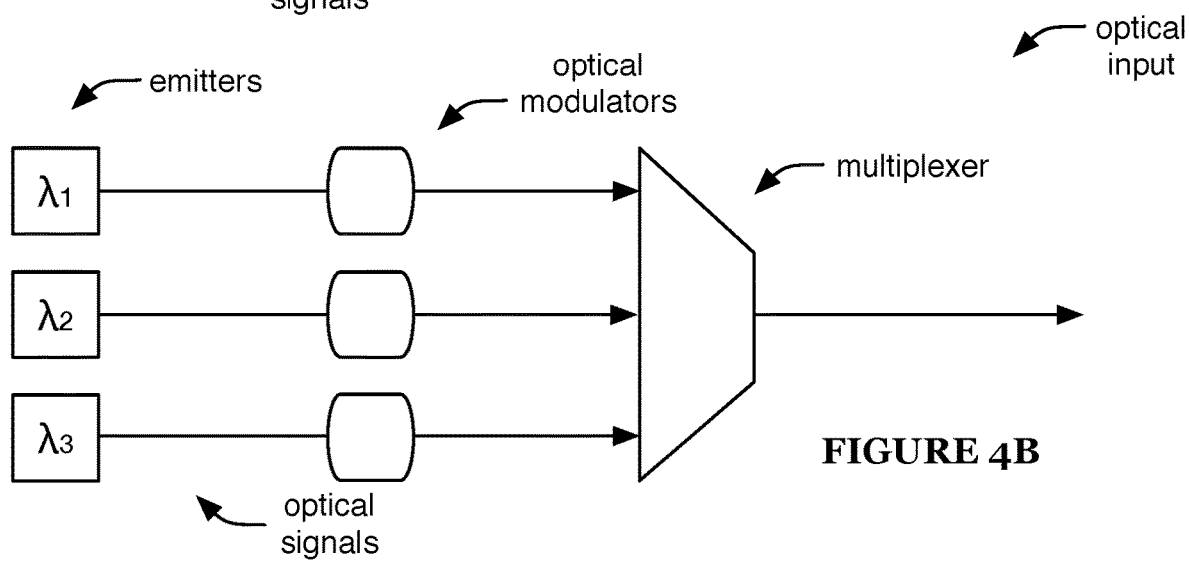
Figure 4C:
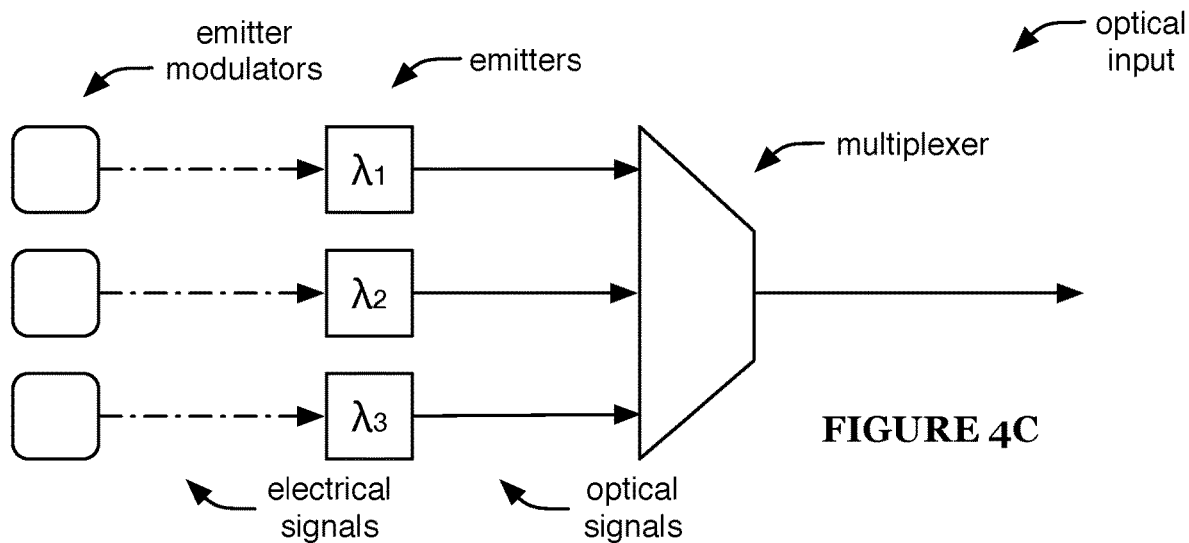

In a second embodiment, modulated signals from multiple optical transducers (e.g., electro-optical transducers) are combined by a multiplexer. In a first example of this embodiment, an optical modulator is arranged between each emitter and the multiplexer (e.g., as shown in FIG. 4B). In a second example, an emitter modulator controls each emitter (e.g., as shown in FIG. 4C).

The input module is preferably controlled by the control module (e.g., by electrical signals from the control module, such as from a data submodule of the control module). The input module preferably outputs to one or more computation modules (e.g., the WDM optical signal is sent to an input of the computation module, preferably along a waveguide; optionally wherein the optical signal is split into multiple signals, which can be sent to different computation modules). However, the input module can additionally or alternatively interface with other elements of the system in any other suitable manner, and/or the input module can additionally or alternatively include any other suitable elements in any suitable arrangement.

Figure 5:
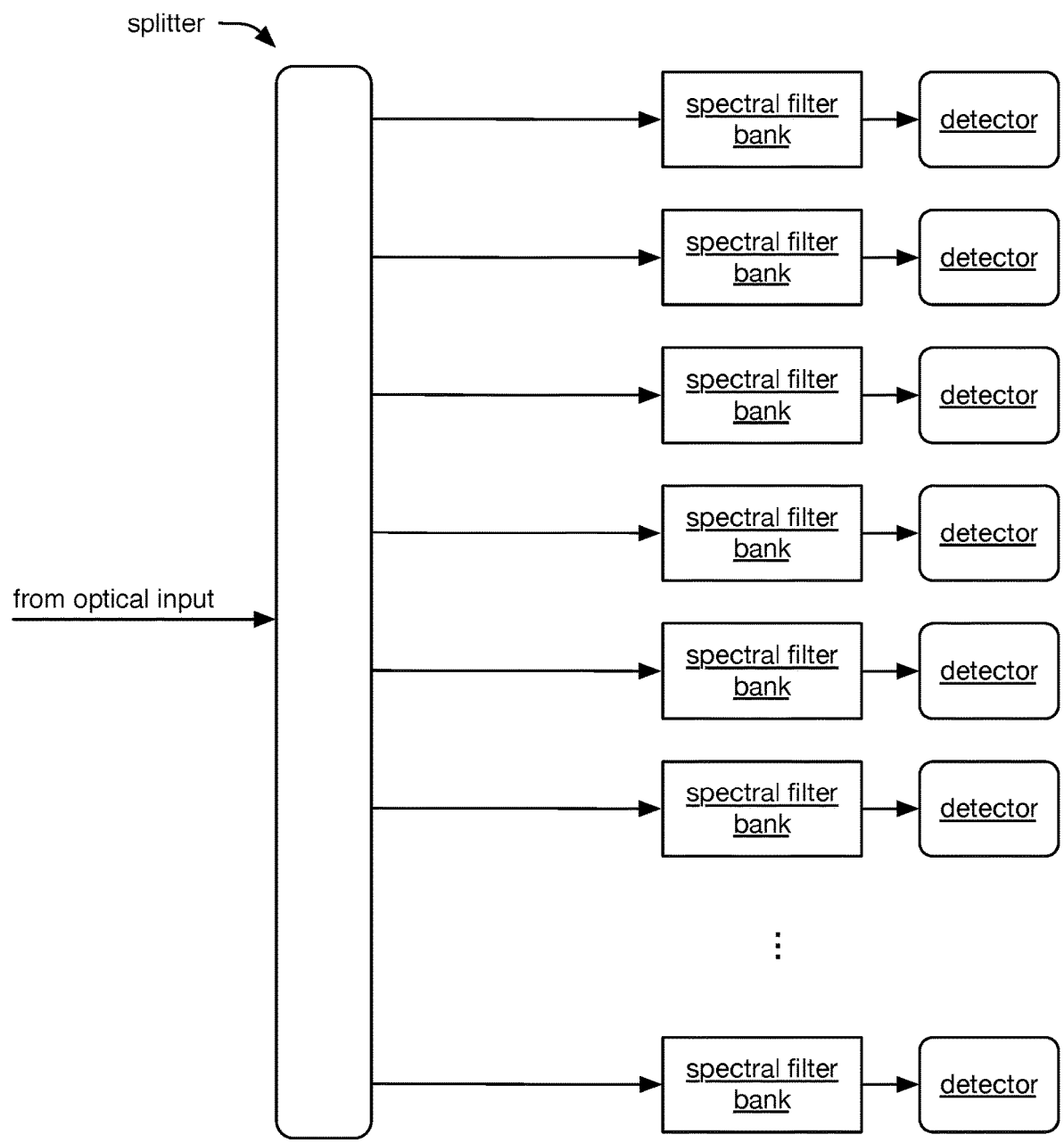
FIG. 5 is a schematic representation of an embodiment of the computation module.

The computation module preferably functions to perform photonic computations (e.g., matrix operations such as matrix multiplications, preferably matrix-vector multiplications; Fourier transforms such as discrete Fourier transforms; convolutions; other multiply-accumulate operations; non-linear operations such as analog sigmoids; etc.) based on signals (e.g., control signals) from the input and/or control modules. For example, the computation module can multiply an input vector (e.g., encoded by the WDM signal received from the input module) by a matrix (e.g., associated with the input signals from the control module) to determine an output vector (e.g., associated with output signals generated by the computation module). The computation module preferably includes one or more spectral filter banks and detectors, and can optionally include one or more splitters, interferometers, and/or combiners (e.g., as shown in FIGS. 5 and/or 6B). However, the computation module can additionally or alternatively include any other suitable elements.

Figure 7A:
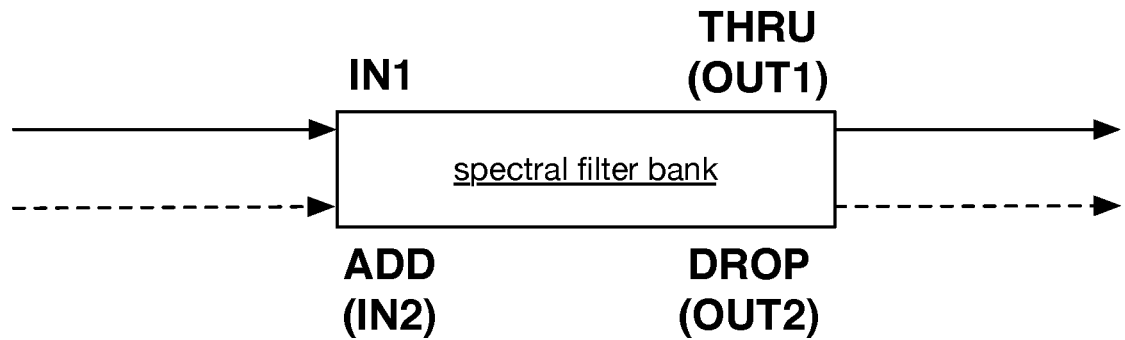
FIGS. 7A-7C are schematic representations of a first, second, and third variation, respectively, of a spectral filter bank.
Figure 7B:
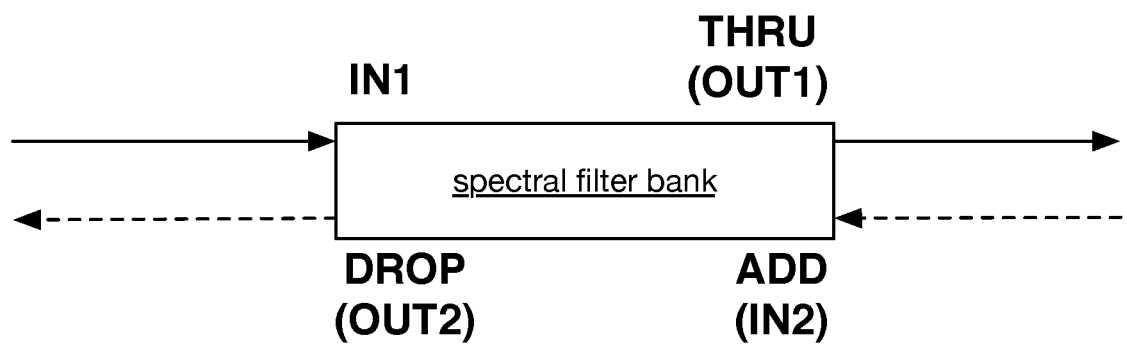
Figure 7C:
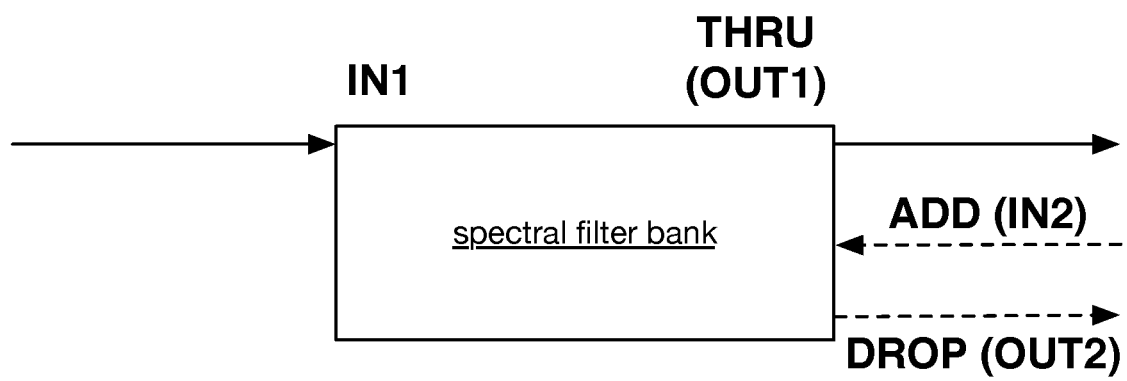

Each spectral filter bank preferably functions to filter (e.g., filter in a substantially time-independent manner; switch, such as at a low rate; modulate at a high rate, such as comparable to the bandwidth of the input optical signal and/or the modulation rate of the modulators of the input signal; otherwise control; etc.) an optical signal based on a control signal. Each spectral filter bank preferably includes a set of filter elements, more preferably wherein each filter element is associated with (e.g., filters) a channel (or set of channels) of the input signal. The computation module preferably includes a plurality of spectral filter banks (e.g., each corresponding to a row of the matrix). Each spectral filter bank preferably receives (e.g., at an IN port of the spectral filter bank) an optical signal input (e.g., WDM signal) and a set of control signals. The optical signal input is preferably received from the splitter (e.g., along one or more of the paths onto which the signal is split), but can additionally or alternatively be received from any other suitable element. The control signals (e.g., filter weights) are preferably received from the control module, but can additionally or alternatively be received from any other suitable element. The control signals are preferably electrical signals (e.g., voltage or current signals), but can additionally or alternatively include any other suitable signals. The control signals preferably control operation of one or more filter elements of the spectral filter bank. The control signals preferably include one weight for each filter element, but can additionally or alternatively include any other suitable number of weights. In some embodiments, the number of filters and number of weights can be equal to the number of channels in the optical signal input (e.g., equal to the number of emitters in the input module). Each weight and filter can correspond to an element of the matrix row associated with the spectral filter bank (or to an integer number of such elements, such as 2, 4, 8, 16, 32, 2-8, 9-32, etc.). The spectral filter bank preferably outputs the filtered optical signal(s) (e.g., to one or more detectors). In some examples, the spectral filter bank has multiple optical outputs (e.g., THRU port and DROP port, OUT 1 port and OUT 2 port, etc.), one or more of which outputs to a detector (e.g., as shown in FIGS. 7A-7C). The spectral filter bank(s) can include microring resonators, microdisk resonators, photonic crystal-based resonators, any modulators described above regarding the input modulators, and/or any other suitable filters. The spectral filter bank(s) can additionally or alternatively include a plurality of modulators (e.g., as described regarding the rows of N optical amplitude modulators, preferably wherein each spectral filter bank includes one such row) such as described in U.S. Pat. No. 8,027,587, issued Sep. 27, 2011 and titled "Integrated Optic Vector-Matrix Multiplier", which is hereby incorporated in its entirety by this reference. A person of skill in the art will recognize that each filter element can include a single filtering device, multiple filtering devices (e.g., arranged in series and/or parallel), multiple tunable elements, and/or any other suitable elements capable of filtering a channel (or set of channels) of the input signal.

Figure 6A:
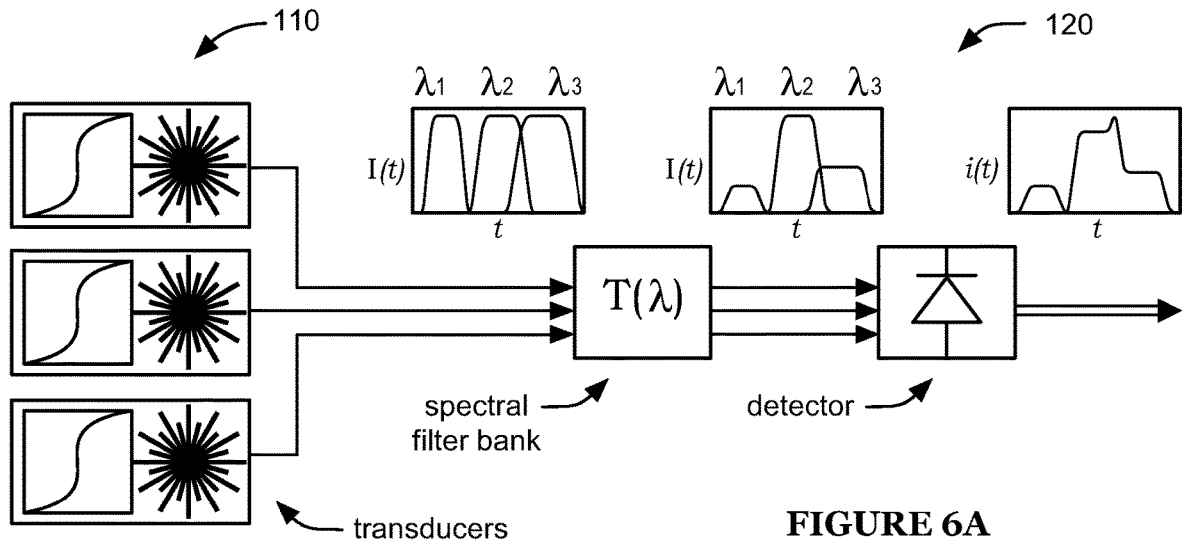
FIGS. 6A-6B are schematic representations of a first and second example, respectively, of photonic elements of the system.
Figure 6B:
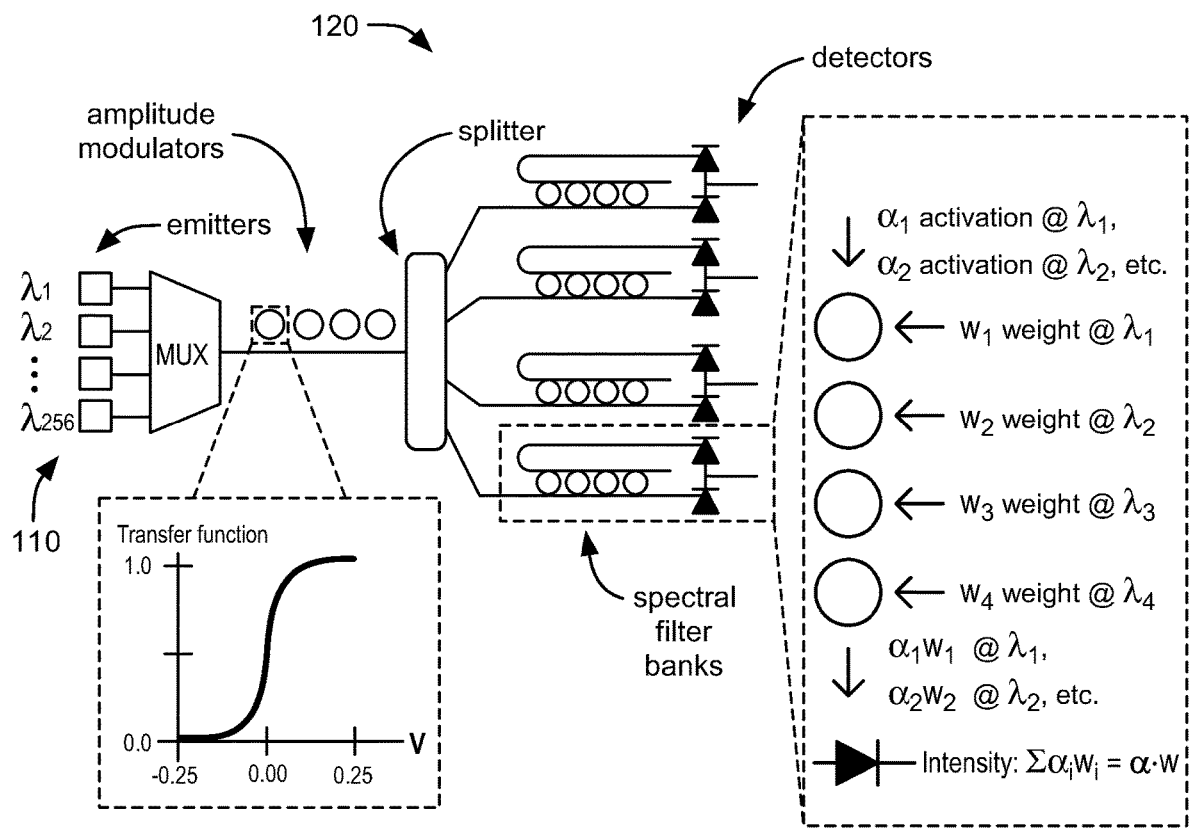

The filter elements (e.g., of the spectral filter banks) preferably function to filter the optical input signal. In a first embodiment of the spectral filter bank, every channel propagates past all the filter elements of the spectral filter bank (e.g., as shown in FIGS. 6A, 8A, and/or 8B). In this embodiment, the filter elements are preferably wavelength-selective optical filters (e.g., substantially filtering only a narrow wavelength band, such as substantially filtering only light of a single channel). The wavelength-selective optical filters are preferably microresonators (e.g., more preferably microdisk resonators, but additionally or alternatively including microring resonators, photonic crystal defect state filters, etc.). The microresonators (e.g., microdisks, microrings, etc.) can have any suitable doping geometry, such as, for example, vertical junction, interleaved, interior ridge, and/or zig-zag doping geometries.

The optical filter can optionally be embedded in one or more other structures, such as a resonator and/or Mach-Zehnder interferometer (MZI), which can function to enhance its modulation performance and/or alter the modulation mechanism. In some variations, the optical filter includes multiple microresonators (e.g., as described in Alexander N. Tait, Allie X. Wu, Thomas Ferreira de Lima, Mitchell A. Nahmias, Bhavin J. Shastri, and Paul R. Prucnal, "Two-pole microring weight banks," Opt. Lett. 43, 2276-2279 (2018), which is hereby incorporated in its entirety by this reference). In some variations, the optical filter includes multiple filters and/or modulators coupled together using inverse design (e.g., as described in Weiliang Jin, Sean Molesky, Zin Lin, Kai-Mei C. Fu, and Alejandro W. Rodriguez, "Inverse design of compact multimode cavity couplers," Opt. Express 26, 26713-26721 (2018), which is hereby incorporated in its entirety by this reference). Each filter of a spectral filter bank (e.g., weight bank) preferably has a different resonance wavelength (e.g., resonance wavelength under a particular set of conditions, such as a typical operating temperature and no applied voltage). Preferably, each resonance wavelength corresponds to (e.g., is within, such as substantially centered within) a different wavelength channel (e.g., as shown in FIG. 2A, wherein each vertical dotted line represents the central wavelength of the indicated channel). In some examples, each optical filter is associated with a filter monitor (e.g., configured to detect light filtered by, coupled into and/or through, and/or otherwise affected by the filter), such as a resonator with an intracavity detector, or an add-drop resonator that couples a portion of the filtered light to a photodetector (e.g., as shown in FIG. 3B).

In a second embodiment, each channel is split onto a different sub-path to interact with a filter element associated with that channel. In a first example of this embodiment, the modulated path includes for each channel: a drop filter to branch a sub-path off the main path, a filter on that sub-path, and an add filter to rejoin the signal from the sub-path to the main path. In this example, the filter is preferably a microresonator (e.g., microring resonator, microdisk resonator, etc.), but can additionally or alternatively include a Bragg filter (e.g., fiber Bragg grating; Bragg reflector, preferably with a mirror and circulator such as a monolithic Bragg reflector with an optical loop mirror and a circulator; wavelength-selective coupler with embedded grating; etc.) and/or any other suitable filter. In a second example, the modulated path includes a demultiplexer to create a plurality of sub-paths, a filter on each sub-path, and a multiplexer to recombine the sub-paths following modulation. In this embodiment, each filter can be an electro-refractive element, a microresonator, and/or any other suitable filter.

However, the system can additionally or alternatively include any other suitable optical filters. Although referred to herein as optical filters, a person of skill in the art will recognize that the filters can additionally or alternatively include optical switches, optical modulators, and/or any other suitable elements.

Figure 8B:
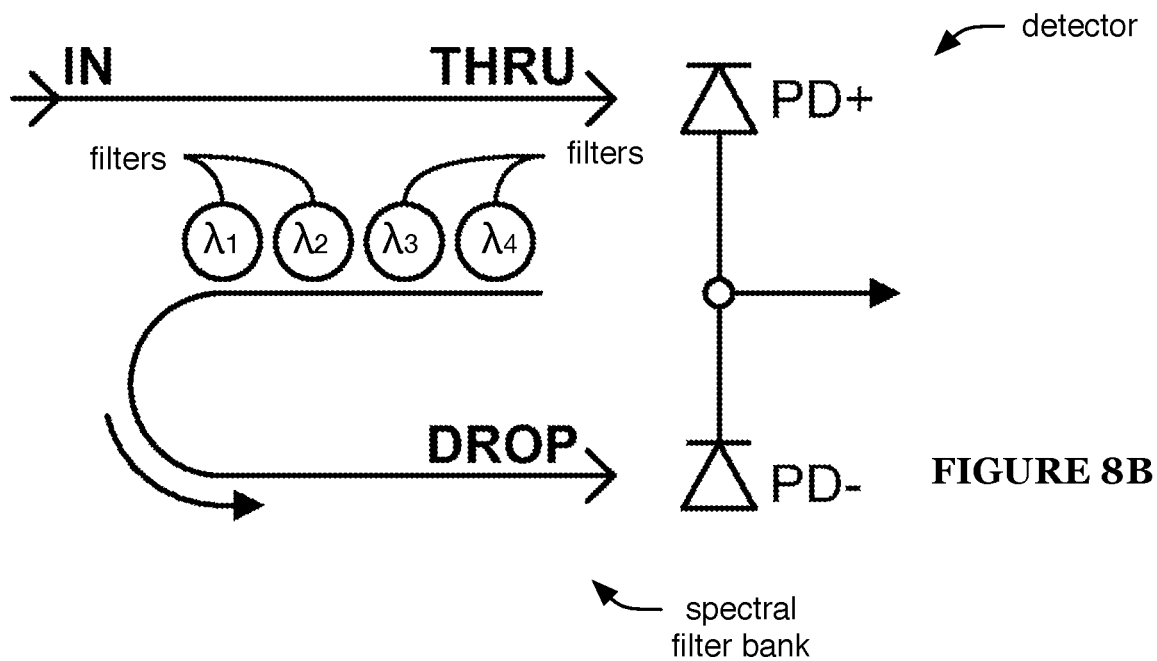

Each detector preferably functions to transduce an optical signal (e.g., into an electrical signal). The computation module preferably includes one detector (e.g., summation detector) associated with each spectral filter bank. However, the computation module can alternatively combine signals from multiple spectral filter banks, wherein the combined signal is input to a single detector. The detectors preferably include one or more photodetectors (e.g., photodiodes), but can additionally or alternatively include any other suitable detectors. In a first embodiment, each detector includes a pair of photodiodes (e.g., balanced photodetector), such as one each on the THRU and DROP ports of the spectral filter bank (e.g., as shown in FIG. 8B). In a second example, the detector is a single photodiode (e.g., on either the THRU or the DROP port). However, the detector can additionally or alternatively include any other suitable arrangement of photodiodes and/or other detectors. Each detector output and/or derivatives thereof, such as combinations of detector outputs (e.g., sums or differences of multiple detector outputs) is preferably delivered to the control module (e.g., as an electrical signal). However, one or more detector outputs can additionally or alternatively be used to drive one or more transducers (e.g., transducers of the same input module, of another input module, etc.).

The splitter preferably functions to split a signal (e.g., received from the input module), propagating the split signal along a plurality of paths (e.g., waveguides). The number of paths onto which the signal is split is preferably based on the number of spectral filter banks in the computation module (e.g., one path for each weight bank, two paths for each weight bank, three paths for each weight bank, etc.). The splitting is preferably wavelength-independent; alternatively, different wavelength selective elements can be used to split each channel (or set of multiple channels, such as adjacent channels) independently. The signal is preferably split equally (or substantially equally) between all paths and/or spectral filter banks, but can alternatively be split with any other suitable intensity distribution. The splitter can include one or more splitter elements, such as two-way splitters, star couplers, multi-mode interference (MMI) couplers, inverse designed couplers, and/or any other suitable elements. In one example, the splitter is a tree splitter, including a plurality of splitter elements in a tree configuration (e.g., including a plurality of two-way splitters arranged in a binary tree). In some variations, the tree splitter can include elements of one or more of the above types. For example, a plurality of 1×k couplers (i.e., couplers that split a single input into k paths) can be combined in serial layers to provide N outputs.

In a first embodiment, the signal from the input module is split directly and propagated to all of the spectral filter banks (e.g., as shown in FIG. 5).

In a second embodiment, splitters are interspersed with (and/or integrated with) spectral filter banks. In this embodiment, the splitter elements and filter banks can be arranged in a tree structure (e.g., binary tree structure, tree of star couplers, etc.). In a specific example, the spectral filter banks are integrated with a set of MZIs (e.g., a spectral filter bank on one path of each MZI), wherein the THRU port of any given MZI is fed to the IN port of a first downstream MZI and the DROP port of the given MZI is fed to the IN port of a second downstream MZI.

However, the system can additionally or alternatively include any other suitable splitter(s) in any suitable arrangement (e.g., including one or more optical taps, each of which preferably includes a splitter and a photodetector; in examples, such optical taps could include: taps in the input module configured to monitor the optical input signal, taps in the filter banks configured to monitor the filtered signals, and/or taps configured to monitor any other suitable signals), or can include no splitter (e.g., wherein the computation module includes a single spectral filter bank and detector which filter the optical input signal). Further, the computation module can additionally or alternatively include any other suitable elements in any suitable arrangement.

The control module preferably functions to provide (e.g., transmit) inputs (e.g., data) to, receive outputs from, and/or control operation of the other elements of the system. In some examples, the control module includes one or more data submodules (e.g., configured to provide data, preferably input data such as weights and/or input vector values, to the input and/or computation modules) and/or controller submodules (e.g., configured to coordinate operation of the input and/or computation modules, such as coordinating flow and/or execution of data and/or computation instructions, etc.). The control module preferably controls (e.g., provides electrical control signals to) the transducers of the input module and/or the spectral filter banks (e.g., the modulators) of the computation module. The control module preferably receives outputs (e.g., electrical signals) from the detectors, and can additionally or alternatively receive outputs from the optical taps, filter monitors, and/or any other suitable elements of the system. The control of the transducers, filters and/or other elements can optionally be altered based on the received outputs.

The control module can include, for example, one or more one or more processors, preferably electronic processors (e.g., CPU, GPU, microprocessor, FPGA, ASIC, SIMD, coarse-grained reconfigurable array, etc.), storage elements (e.g., RAM, flash, magnetic disk drive, etc.), look up tables, serializers, deserializers, digital to analog converters (e.g., which can function to generate control signals for the transducers, filters, and/or other controlled elements), analog to digital converters (e.g., which can function to encode the detector output signals), and/or any other suitable elements.

The system and/or elements thereof are preferably implemented as one or more integrated circuits. For example, the photonic modules (e.g., input module, computation module) and/or subsets thereof can be and/or include one or more photonic integrated circuits, and/or the entire system can be a portion of a single integrated circuit. However, the system can additionally or alternatively be implemented in any other suitable device structure(s).

However, the computation module and/or the system can additionally or alternatively include any other suitable elements in any suitable arrangement.

In some embodiments, the system includes one or more elements such as described in U.S. Pat. No. 8,027,587, issued Sep. 27, 2011 and titled "Integrated Optic Vector-Matrix Multiplier", which is hereby incorporated in its entirety by this reference. However, the system can additionally or alternatively include any other suitable elements.

The system can include (e.g., be made of) any suitable materials. The system (and/or elements thereof, such as some or all of the photonic elements) can be implemented on one or more material platforms, such as photonic integrated circuit platforms (e.g., silicon photonics platforms, monolithically integrated photonics and electronics platforms, other photonic platforms, etc.), microelectronic platforms, and/or any other suitable material platforms. In a first embodiment, the system is implemented as a monolithic platform (e.g., including both photonic elements and electronic elements on a single chip). In a second embodiment, the system is implemented as a heterogeneously integrated platform, such as a platform including two or more chips (e.g., with electronic and/or photonic interfaces between the chips). For example, the heterogeneously integrated platform can include a photonics chip including photonic elements (e.g., and relatively few or no electronic elements, relatively few or no electronic elements with fabrication dimensions below a threshold, etc.; alternatively, including significant electronic elements) and an electronics chip including electronic elements (e.g., and few or no photonic elements; alternatively, including significant photonic elements). In some examples (e.g., of the second embodiment), the system is fabricated via co-integration (e.g., between electronics and photonics), such as wherein different elements of the system can be joined together (e.g., for wafer-to-wafer, die-to-wafer, and/or die-to-die bonding) using one or more packaging technologies such as flip chip bonding, wafer bonding (e.g., direct bond interconnect, hybrid bonding, etc.), through-oxide vias (TOVs), through-silicon vias (TSVs), metal bonding (e.g., eutectic bonding), adhesive bonding, and/or any other suitable bonding interfaces.

In one embodiment, the system can include elements implemented in a silicon photonics platform (e.g., implemented by one or more foundries such as APSUNY, IME, IMEC, GlobalFoundries, TSMC, etc.), which can include silicon, silicon doping, silicon oxides, passive silicon components (e.g., waveguides, filters, etc.), and/or germanium-based elements (e.g., detectors, filters and/or modulators, such as EAMs, etc.). Additionally or alternatively, the system can include elements implemented in one or more III-V platforms (e.g., JePPiX consortium SMART Photonics and/or HHI platforms, Infinera, AIM Photonics, etc.), which can include materials such as indium compounds, phosphide compounds, gallium compounds, arsenide compounds, and/or any other suitable III-V semiconductors (e.g., InGaAsP alloys, such as InP or GaAs substrate with InGaAsP features). In an example of this embodiment, the emitters (e.g., laser array) are fabricated in the III-V semiconductor platform, the multiplexer is fabricated in either the III-V semiconductor platform or the silicon photonics platform, and substantially all other photonic elements of the system (e.g., except some or all waveguides associated with the emitters) are fabricated in the silicon photonics platform. In some examples, the elements can be co-integrated with elements implemented in an electronics platform (e.g., integrated such as described above regarding packaging technologies). In some such examples, one or more electronic elements (e.g., transistors) are fabricated in the photonics platform rather than the electronics platform (e.g., thereby enabling and/or facilitating use of high-voltage elements that exceed the voltage limits of the electronics platform). For example, in a system in which elements from a 7 nm electronics platform (e.g., with a 0.6-0.8V limit, such as a 0.65, 0.7, or 0.75 V limit) are coupled with elements from a silicon photonics platform, the silicon photonics platform elements can include transistors (e.g., configured to amplify signals received from the electronics platform elements) operating with voltages in excess of the electronics platform limit.

The system can additionally or alternatively include elements implemented in a monolithically integrated photonics and electronics platform (e.g., platform typically used for microelectronics) such as a monolithically integrated silicon photonics and electronics platform, preferably wherein some or all photonic and electronic elements of the system are implemented monolithically (e.g., collocated in the same integrated circuit). Additionally or alternatively, the systems can include elements implemented in a co-integrated electronic and photonic platform, such as one that includes front-end-of-line (FEOL) modifications to a standard microelectronic fabrication process and/or back-end-of-line (BEOL) modifications for the fabrication of integrated photonic components (e.g., with low capacitance links to the electronics).

The system can additionally or alternatively include elements implemented in a hybrid silicon/III-V photonics platform, such as wherein silicon photonics elements and III-V photonics elements (e.g., optical amplifiers, laser sources, etc.) are implemented monolithically (e.g., collocated in the same integrated circuit). For example, a III-V semiconductor substrate (e.g., InP) can support both the silicon photonics elements and III-V photonics elements.

The system can additionally or alternatively include elements implemented in a silicon nitride photonics platform (e.g., JePPiX consortium TriPLeX platform), such as including waveguides defined by silicon nitride within a silicon oxide.

The system can additionally or alternatively include elements implemented in a silicon-graphene photonics platform, such as wherein one or more photonic elements (e.g., active elements, such as detectors, filters, modulators, etc.) are implemented using graphene, other graphitic materials, and/or other 2-D materials.

The system can additionally or alternatively include elements implemented in a lithium niobate photonics platform, which can include one or more photonic elements implemented using lithium niobate, such as thin-film lithium niobate.

A person of skill in the art will recognize that the elements described herein using the term "waveguide" can additionally or alternatively include any other suitable optical paths and/or elements associated with optical paths (including, without limitation, free-space paths and/or paths including free-space segments).

However, the system can additionally or alternatively be implemented in any other suitable material platform, and can additionally or alternatively include any other suitable materials.

2. Method.

Figure 9:
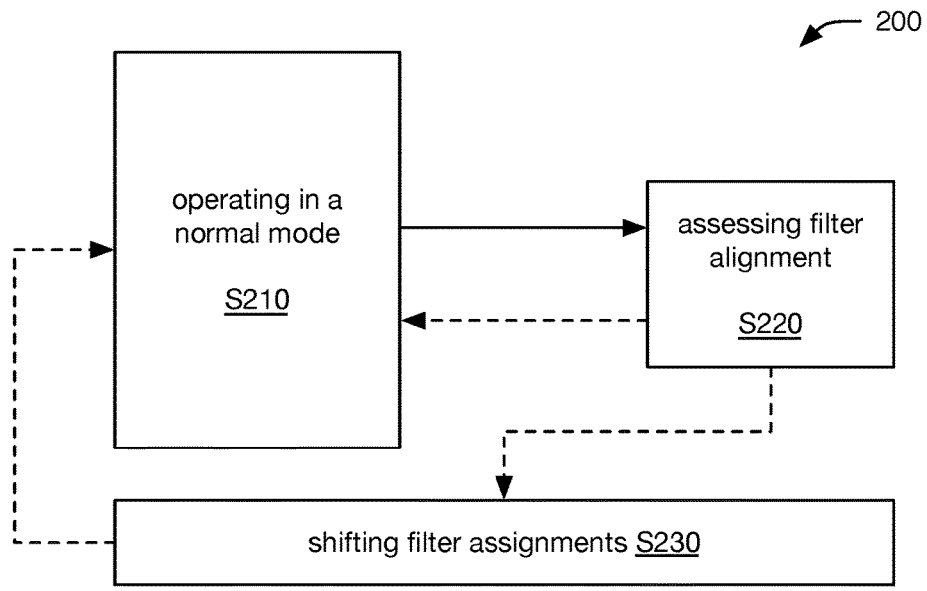
FIG. 9 is a schematic representation of an embodiment of the method.

A method 200 for optical filter operation preferably includes: operating an optical filter system in a normal mode S210, assessing filter alignment S220, and/or shifting filter assignments S230 (e.g., as shown in FIG. 9). However, the method 200 can additionally or alternatively include any other suitable elements. The method 200 is preferably performed using (e.g., performed by) the system 100 (e.g., as described above), but can additionally or alternatively be performed using any other suitable optical modulator system. Although described as performed using one or more filters, a person of skill in the art will recognize that the method 200 can additionally or alternatively be performed using one or more modulators (e.g., optical modulators, preferably wavelength-selective optical modulators) in place of one or more of the filters, such as using one or more input modulators of the system 100.

The method 200 preferably functions to enable and/or enhance operation of one or more spectral filter banks (and/or operation of a system associated with the spectral filter banks, such as the system 100) over a wide range of temperatures (e.g., 5, 10, 20, 35, 50, 75, 80, 100, 150, 1-5, 5-10, 10-20, 20-50, 50-100, or 100-200° C. range, preferably a range about a normal, mean, or median operating temperature, such as a temperature in the range 15-35° C.; in one example, at least the range between 0° C. and 80° C.). However, the method can additionally or alternatively perform any other suitable function(s).

2.1 Operating in a Normal Mode.

Operating an optical filter system in a normal mode S210 preferably functions to use one or more sets of filters to filter a WDM signal (e.g., signal received from the optical input). S210 preferably includes using the filters to perform photonic computations (e.g., vector and/or matrix operations, such as vector-matrix multiplication, vector dot products, etc.), but can additionally or alternatively include operating the optical filter system for any other suitable purpose(s).

S210 preferably includes controlling each filter of a set (e.g., spectral filter bank) to filter an assigned channel of the WDM signal (e.g., signal from the optical input). This can include controlling the amount (e.g., relative amplitude) of the channel signal (e.g., relative amount, such as a percentage of the total intensity and/or power) that is transmitted, redirected, and/or otherwise affected by the filter. This can additionally or alternatively include changing the phase of the channel signal or one or more portions thereof (e.g., portions that are transmitted, redirected, absorbed, and/or otherwise affected by the filter). The amount is preferably an arbitrary value (e.g., relative amplitude in the range 0-100% or between any other suitable values, such as with a maximum transmission value substantially less than 100% and/or a minimum redirection or absorption value substantially greater than 0%; and/or phase shift in the range 0-π, 0-2π, or between any other suitable values), such as for analog filtering, or one of a set of predefined values (e.g., predefined steps within the relative amplitude range 0-100% or within any other suitable range, such as with a maximum transmission value substantially less than 100% and/or a minimum redirection or absorption value substantially greater than 0%; and/or phase shift range 0-π, 0-2π, or between any other suitable values), such as for non-binary digital filtering. However, the amount can additionally or alternatively be one of two values (e.g., a two-state modulation, such as for binary filtering), such as an on/off modulation (e.g., as described in M. Georgas et al., "Addressing link-level design tradeoffs for integrated photonic interconnects," in Custom Integrated Circuits Conference (IEEE, 2011), 978-1-4577-0233-5/11, which is herein incorporated in its entirety by this reference; optionally such as described in M. Georgas et al., but with modifications such as incorporating one or more system and/or method elements described herein), and/or can include controlling the channel signal in any other suitable manner. The filter is preferably controlled based on a control signal (e.g., applied voltage). For example, the filter resonance can change (e.g., be tuned) in response to an applied voltage (e.g., by 0.1-1 nm/V, such as approximately 0.2-0.3 nm/V; by 10-200 GHz/V, such as approximately 30-50 GHz/V; etc.), typically wherein the resonance wavelength decreases with increasing (positive) applied voltage but alternatively wherein the resonance wavelength increases with increasing applied voltage.

The control signal is preferably used with feedback (e.g., used as a target set point for the feedback element, such as described below regarding S230) to achieve the target set point (e.g., desired percentage of channel signal transmitted, redirected, and/or otherwise affected by the filter). The feedback can include one or more signals from: detector(s) in or coupled to the filter (e.g., measuring optical power and/or signal intensity coupled into the filter), detector(s) downstream of the filter (e.g., along a transmitted optical path, dropped optical path, etc.) and/or any other suitable detectors and/or other signals associated with filter operation. In some embodiments, the control signal is provided such as described in Alexander N. Tait, Hasitha Jayatilleka, Thomas Ferreira De Lima, Philip Y. Ma, Mitchell A. Nahmias, Bhavin J. Shastri, Sudip Shekhar, Lukas Chrostowski, and Paul R. Prucnal, "Feedback control for microring weight banks," Opt. Express 26, 26422-26443 (2018), which is hereby incorporated in its entirety by this reference. However, the method can additionally or alternatively include providing the control signal in any other suitable manner.

Figure 10:
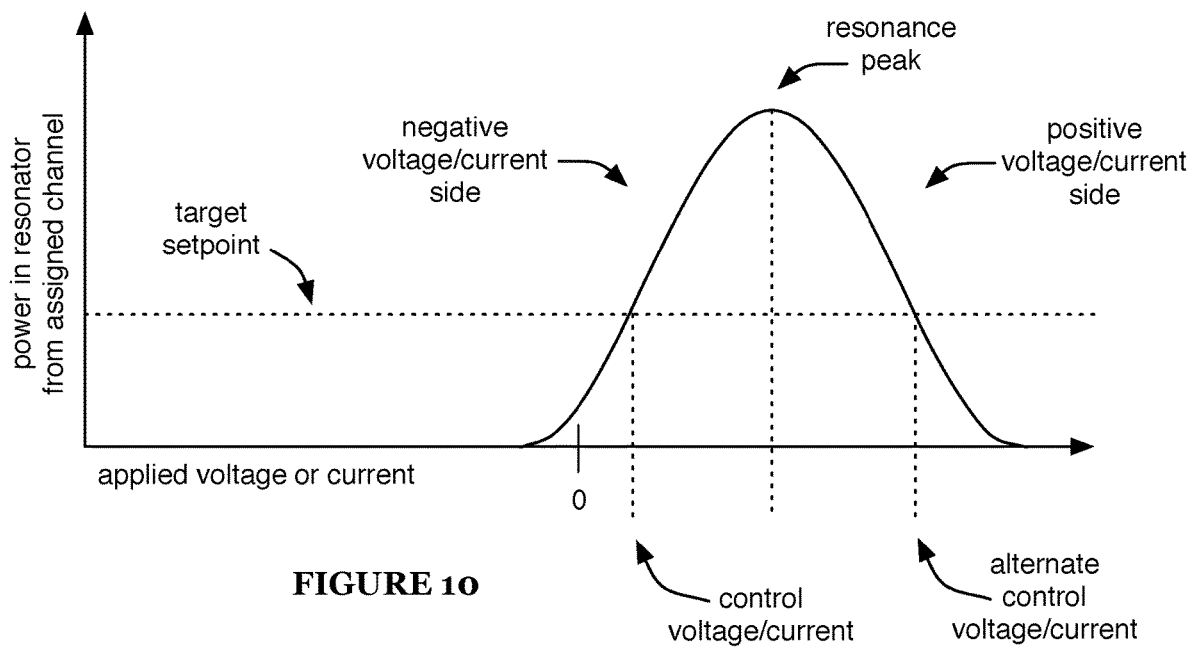
FIG. 10 is a schematic representation of an example of controlling a filter.

For non-maximal filter setpoints (e.g., less than 100% coupling into the resonator), the filter can optionally be controlled on either side of the resonance peak (e.g., on a positive voltage side wherein increasing the applied voltage decreases power coupled into the filter, or on a negative voltage side wherein decreasing the applied voltage decreases power coupled into the filter), such as shown in FIG. 10. In such examples, S210 preferably includes storing information associated with the side of the resonance peak on which the filter is operating (e.g., storing a sign bit representing this information), which can be used, for example, to determine how filter voltage changes will alter the modulation. Alternatively, filter operation can be fixed on a single side (e.g., either the positive voltage or negative voltage side) of the resonance peak, preferably the same side for all filters but alternatively different sides for different filters. In some examples, the resonance peak for some or all filters may be asymmetrical (e.g., having a high-slope side and a low-slope side); in some examples, filter operation is preferably fixed on the low-slope side (e.g., which can offer higher linearity), but can alternatively be fixed on the high-slope side (e.g., which can offer higher responsivity) and/or be otherwise assigned (e.g., fixed based additionally or alternatively on factors other than the slope, not fixed to a single side, etc.).

In one example, for a set of filters (e.g., a spectral filter bank), S210 can include determining a weight (e.g., filter set point) for each channel. The weight for each channel is preferably fixed or substantially fixed (e.g., does not change over a significant period of time, such as a period of time much greater than the computation clock cycle). In one example, the set of weights defines a matrix, a row or column of a matrix (e.g., wherein other spectral filter banks define other rows or columns of the matrix, thus cooperatively defining the entire matrix over the group of spectral filter banks), and/or any other suitable computational entity. In this example, the WDM input signal changes (e.g., is changed by modulators, such as described above regarding transducers and/or input modulators of the system 100) to provide different input vectors (e.g., to be multiplied by the matrix defined by the spectral filter bank or spectral filter banks). The WDM input signal preferably changes rapidly (e.g., at a GHz-scale rate, such as 0.1, 0.2, 0.5, 1, 2, 5, 10, 20, 50, 100, 0.1-0.3, 0.3-1, 1-2, 2-5, 5-10, 10-30, or 30-100 GHz), but can additionally or alternatively change at any other suitable rate. 210 preferably includes receiving (e.g., from the input module and/or control module) information associated with the expected (e.g., average, median, etc.) input intensity, preferably, the expected input intensity for each channel, but alternatively averaged (or otherwise combined) over any suitable group of channels and/or associated with any other suitable input intensity.

In some embodiments, S210 includes one or more elements such as described in U.S. Pat. No. 8,027,587, issued Sep. 27, 2011 and titled "Integrated Optic Vector-Matrix Multiplier", which is hereby incorporated in its entirety by this reference (e.g., implementing elements of the functionality of U.S. Pat. No. 8,027,587 using the system 100 described herein).

However, S210 can additionally or alternatively include operating the optical filter system in the normal mode in any other suitable manner.

2.2 Assessing Filter Alignment.

Assessing filter alignment S220 preferably functions to determine whether the filter resonances are appropriate for the assigned channels. If a filter is determined to be misaligned (e.g., based on one or more shift criteria, such as described below), S220 preferably includes determining a channel assignment shift to re-align the filter. In embodiments in which the system includes one or more heater elements, S220 can additionally or alternatively include controlling heater elements to improve the filter alignment (e.g., if a filter is not hot enough and/or or has a misaligned resonant wavelength, increasing heat output from a heater element associated with the filter; if a filter is too hot and/or or has a misaligned resonant wavelength, decreasing heat output from a heater element associated with the filter). Filter alignment is preferably assessed for each filter (e.g., of the system, of a set, etc.), but can additionally or alternatively be assessed for any other suitable group of filters and/or any suitable subset of the filters. Filter alignment can be assessed based on the desired weight(s) for a channel (e.g., current weight to apply, future planned weight, etc.), can be assessed independent of the weight (e.g., assessed based on whether the alignment is appropriate for all possible weights used by the system and/or method), and/or assessed based on any other suitable context.

During operation of the system, the filter resonance wavelengths and channel wavelengths (e.g., laser emission wavelengths) may change (e.g., separately from each other), such as due to temperature changes in the system, temperature disparities between different regions of the system, and/or any other suitable effects, which may result in misalignment between a filter resonance and the its assigned channel. For example, typical microdisk resonators may exhibit temperature-based resonance changes in the range of 3-30 GHz/K (e.g., 10 GHz/K) and/or 0.02-0.5 nm/K (e.g., for typical emitter wavelengths, such as near 1550 nm). Filters typically exhibit an increase in resonance wavelength with increasing temperature, but can alternatively exhibit a decrease in resonance wavelength with increasing temperature. In some examples, the filters can be modified to reduce (or substantially eliminate) such temperature dependence (e.g., as described in Stevan S. Djordjevic, Kuanping Shang, Binbin Guan, Stanley T. S. Cheung, Ling Liao, Juthika Basak, Hai-Feng Liu, and S. J. B. Yoo, "CMOS-compatible, athermal silicon ring modulators clad with titanium dioxide," Opt. Express 21, 13958-13968 (2013), which is herein incorporated in its entirety by this reference). However, the filters and/or emitters can additionally or alternatively exhibit any other suitable temperature dependence (which can include having substantially no temperature dependence).

Figure 11A:
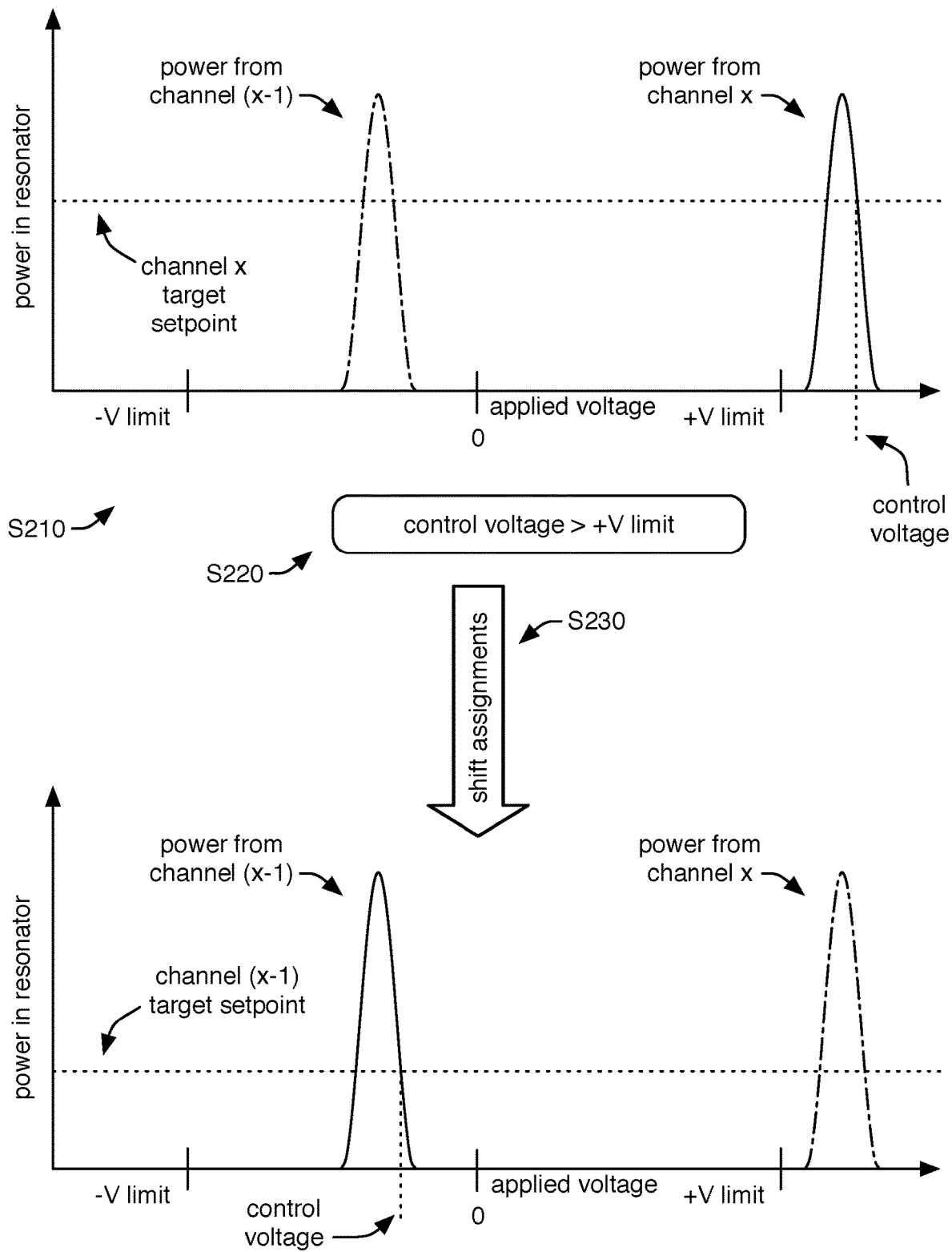
FIGS. 11A-11B are flowchart representations of a first and second example of the method, respectively.
Figure 11B:
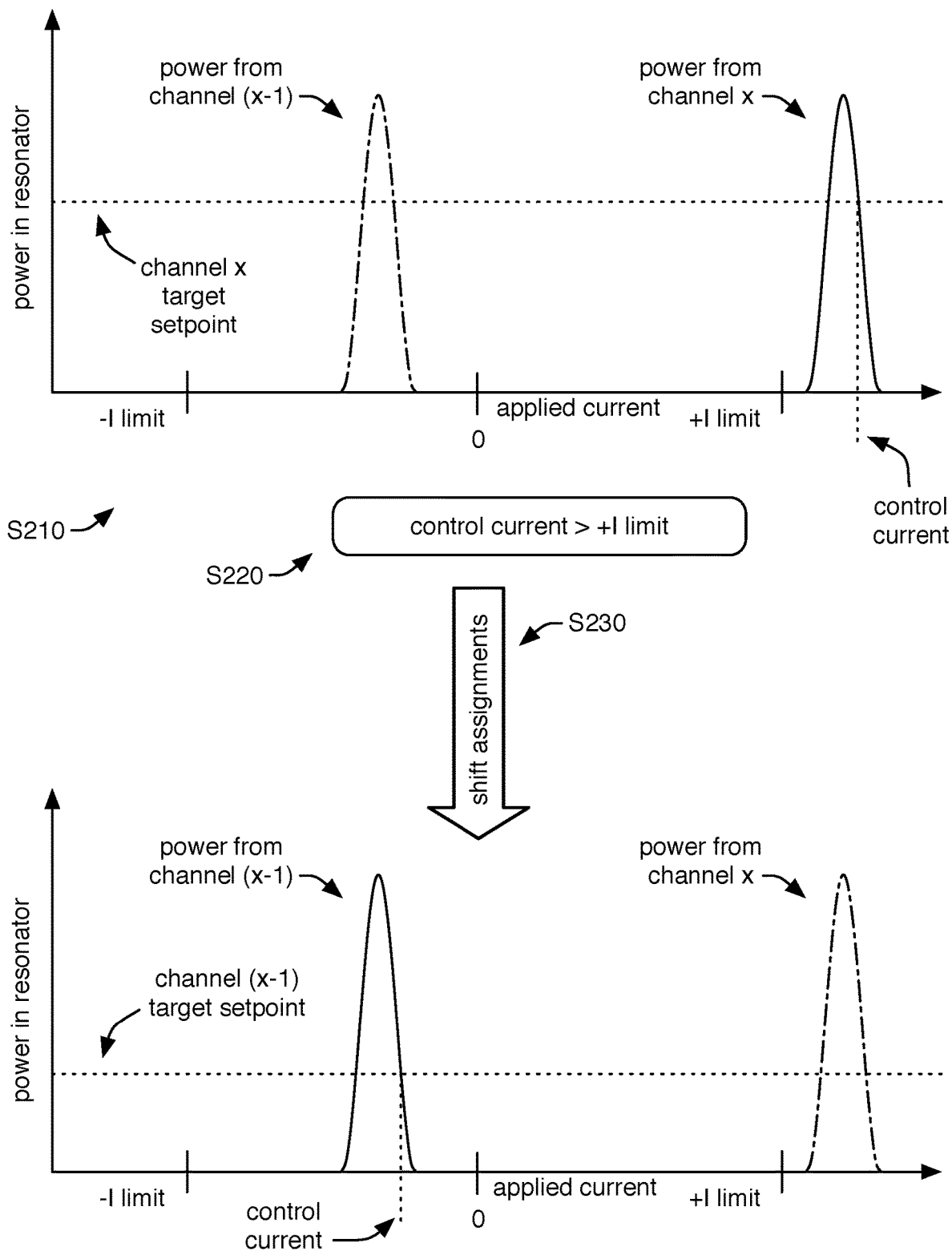

In a first embodiment, filter alignment is assessed based on the control signal (e.g., one or more applied stimuli, such as voltage, current, heat, etc.). The control signal can be compared to one or more limits (e.g., wherein some or all shift criteria are based on the control signal). Preferably, if the control signal falls outside a range defined by the limits (e.g., meets a shift criterion), the filter alignment is poor and/or should be altered (e.g., a channel shift is desired and/or needed), such as shown by way of example in FIGS. 11A-11B. In some embodiments (e.g., in which both sides of the filter resonance peak are used for filtering), the limits are symmetric (e.g., about a zero-value control signal, such as zero applied voltage), which can be equivalent to a limit on the magnitude on the control signal. Alternatively, there can be separate (e.g., different, asymmetric) upper and lower limits on the control signal (e.g., different non-zero limits, such as an upper limit greater than zero and a lower limit less than zero, both limits greater than zero, or both limits less than zero; one zero-value limit and the other non-zero, such as wherein the control signal is limited to only positive values, between zero and the upper limit, or to only negative values, between the lower limit and zero; etc.). In one such example, one limit is a control signal value that controls the filter to move the resonance peak substantially overlapping the light of the channel (e.g., substantially equal to the central wavelength of the channel, substantially maximizing resonance with light of the channel, etc.), and the other limit is an extremal value, preferably one that controls the filter to reduce resonance with the light of the channel (e.g., to substantially zero resonance with the light; to substantially minimize resonance with the light; to a substantially non-zero lower limit of resonance with the light, such as having a threshold fraction of the maximal resonance value, wherein the threshold fraction can be 0.1, 0.2, 0.3, 0.4, 0.5, 0.65, 0.75, 0-0.2, 0.2-0.4, 0.4-0.6, 0.6-0.8, etc.). In some embodiments, the limits are the same for all filters (or all filters of a type, of a spectral filter bank, etc.), such as limits set based on a maximum control power (e.g., wherein power expended controlling a filter and/or the set of all filters does not exceed a threshold value), a maximum voltage (e.g., corresponding to a voltage limit associated with other elements of the system, such as based on feature spacing and/or other fabrication factors), and/or any other suitable criteria. Alternatively, different limits can be set for each filter, such as limits determined to account for fabrication variations (e.g., wherein a filter that is fabricated farther from its specified properties may require greater magnitude control than a filter fabricated close to its specified properties). The limits can optionally define multiple acceptable and/or unacceptable ranges, and/or any other suitable limits can be defined for the control signal. In one example, the applied voltage control signal is limited to within a threshold voltage magnitude (e.g., ±0.25 V, ±0.5 V, ±0.75 V, ±1V, ±1.2 V, ±1.5 V, ±2 V, magnitude less than 0.5 V, magnitude in the range 0.5-1 V, magnitude in the range 1-2 V, magnitude greater than 2 V, etc.). In this embodiment, the direction of realignment (e.g., filter assignment shift) needed or desired is preferably determined based on the control signal (e.g., voltage). If the control signal exceeds the upper limit, the channel should be shifted to a lower-index filter (and/or a higher-index channel should be shifted to this filter). Analogously, if the control signal is less than the lower limit, the channel should be shifted to a higher-index filter (and/or a lower-index channel should be shifted to this filter).

In a second embodiment, the filter alignment is assessed based on one or more system temperatures (and/or changes in temperature). The temperature is preferably determined for (e.g., measured at) the location of and/or near the filter (or set of filters), but can additionally or alternatively be measured in any other suitable location(s). In this embodiment, the alignment of each filter can be assessed separately (e.g., for a filter-specific temperature determination) and/or the alignment of several filters (e.g., all filters of the set) can be assessed as a group (e.g., for a shared temperature determination). The filter is preferably determined to be misaligned (e.g., and thus, a channel shift is desired and/or needed) if the current temperature is outside of a temperature range (e.g., predefined range) associated with the current channel-filter pairing (e.g., wherein some or all shift criteria are based on the temperature). The desired shift direction is preferably determined based on the temperature. In examples in which the filter resonance shifts to shorter wavelengths with decreasing temperature, if the filter temperature is too low, the channel should be shifted to a lower index filter (and/or a higher index channel should be shifted to this filter). Analogously, in such examples, if the filter temperature is too high, the channel should be shifted to a higher index filter (and/or a lower index channel should be shifted to this filter).

In a third embodiment, the filter alignment is assessed based on a photodetector signal (e.g., from the summation detector associated with the spectral filter bank; from a filter-specific detector, such as an internal cavity sensor or external detector, preferably a detector also used for providing feedback such as described above regarding S21o; etc.). In this embodiment, the alignment of all filters of the spectral filter bank is typically assessed as a group, rather than assessing the alignment of each individual filter separately. If the average signal at the photodetector is significantly lower than expected (e.g., based on typical values, previously observed values, average input signal intensity information, etc.), this may indicate poor alignment and/or the need to shift the filter assignments (e.g., wherein some or all shift criteria are based on the photodetector signal). Additionally or alternatively, one or more signals (each preferably corresponding to a single calculation) can be compared with expected values (e.g., dynamically-determined values, such as wherein a matrix operation, such as a vector-matrix multiplication, performed by the spectral filter bank is also calculated by an independent computing element, such as calculated electronically by an electronic computing module and/or calculated photonically by another filter bank), wherein disagreement between the photodetector signal(s) and the expected value(s) (e.g., any disagreement; disagreement by more than a threshold amount, such a maximum error threshold; etc.) may indicate poor alignment and/or the need to shift the filter assignments (e.g., wherein some or all shift criteria are based on the photodetector signal). In embodiments in which both sides of the resonance peak are used for filtering (e.g., as described above regarding S210), the desired shift direction can be determined based on the side of the resonance peak on which the filter is operating (e.g., as represented by the sign bit described above). In such embodiments, if the filter is operating on the low-voltage side of the resonance peak, this may indicate the need to shift the channel to a lower index filter (and/or to shift a higher indexed channel to this filter). Analogously, in such embodiments, if the filter is operating on the high-voltage side of the resonance peak, this may indicate the need to shift the channel to a higher index filter (and/or to shift a lower indexed channel to this filter).

However, the filter alignment can additionally or alternatively be assessed based on any other suitable information.

S220 can be performed continuously, periodically (e.g., after a predetermined number of clock cycles, such as 1000 clock cycles), with increasing intervening intervals (e.g., intervals increasing by 10, 20, 30, 50, 75, 100, 150, 200, 0-10, 10-30, 30-60, 60-100, or 100-300%, etc.; preferably reset to the shortest interval after performance of S230), sporadically (e.g., at random intervals), and/or with any other suitable timing. S220 is preferably performed during normal system operation (e.g., concurrent with S210). Alternatively, performance of S210 can be paused (e.g., as described below regarding S230) during S220. For example, the optical input can switch from a rapidly change WDM input signal (e.g., used in S210) to a fixed light input.

The shift determinations of S220 (e.g., determinations that a channel assignment shift is or is not desired and/or needed) are preferably made for each filter set (e.g., spectral filter bank) of the system, more preferably wherein, if a shift is desired and/or needed for any filter of a set, the shift is performed for the entire set. Alternatively, shift determinations can be made for a single filter, for the entire system, and/or for any other suitable group. Shift determinations are preferably made during each performance of S220 (e.g., made at the S220 performance frequency), but can additionally or alternatively be performed at any other suitable frequency and/or with any other suitable timing.

If a shift is determined to be desirable and/or necessary (e.g., if one or more of the shift criteria, such as the control signal, temperature, and/or photodetector signal criteria described above, are met) for one set (e.g., spectral filter bank) of the system, S220 preferably includes assessing the other sets using less liberal criteria (e.g., permitting only a smaller voltage and/or temperature window before determining that a shift is desirable, such as setting the shift limits at ±0.65 V rather than ±0.75 V). This can optionally include predicting whether a shift will be needed in the future (e.g., for a particular set), such as based on current values of information such as voltage and/or temperature, a time series of such values, information regarding other regions of the system such as temperature in nearby regions and/or any other suitable information, preferably wherein the shift is performed in response to predicting that it will be needed in the future. Such alteration of the shift criteria can be desirable because if a shift is performed for one set, the cost of performing shifts for other sets concurrently may be reduced and/or negligible, and performing multiple shifts concurrently may reduce the total time for which S210 cannot be performed (e.g., may increase time available for computation).

However, S220 can additionally or alternatively include assessing filter alignment in any other suitable manner.

2.3 Shifting Filter Assignments.

Shifting filter assignments S230 preferably functions to reassign channels to appropriate (e.g., well-aligned) filters (e.g., based on their current resonances). S230 is preferably performed in response to determination of a desired and/or necessary shift (e.g., in S220), such as immediately in response, at a pre-determined shift time following such a determination, within a threshold time interval after such a determination (e.g., when normal operation reaches a state in which the negative consequences of pausing for a shift are reduced), and/or with any other suitable timing. However, S230 can additionally or alternatively be performed at any other suitable time and/or in response to any other suitable trigger(s).

S230 can optionally include sending a shift signal (e.g., in response to the determination of the desired shift in S220), such as a signal sent within the control module, a signal sent from the computation module (e.g., from the spectral filter bank) to the control module, and/or a signal between any other suitable entities. The signal is preferably a signal to shift a particular set (or sets) of filters (e.g., a particular spectral filter bank). The signal preferably includes the shift direction, but can alternatively omit such information (and/or can be associated with a more complex reassignment than a barrel shift). Alternatively (e.g., in embodiments in which both sides of the resonance peaks are used), if modulation is currently being performed on the suboptimal side of the resonance peak (e.g., on the low-voltage side of the resonance peak if the applied voltage is less than the lower shift limit, on the high-voltage side of the resonance peak if the applied voltage is greater than the upper shift limit), the shift signal can be indicative of a need to shift to the opposing side of the resonance peak (e.g., without reassigning filters).

S230 preferably includes (e.g., in response to receiving the shift signal and/or any other suitable trigger to shift filter assignments) pausing the input data stream (e.g., at the optical input). The optical input is preferably controlled to provide a fixed (e.g., pre-determined) light intensity (e.g., for each channel) during S230, such as a fraction of full intensity (e.g., 10, 20, 30, 50, 80, 90, 100, 0-10, 10-30, 30-70, 70-90, or 90-100%, etc.), an absolute intensity, and/or any other suitable intensity. The intensity of each channel is preferably substantially equal (e.g., same fractional intensity relative to a maximum for the given channel, same absolute intensity, etc.), but can alternatively differ between channels. The input data stream can be paused for the duration of a single input sample (e.g., at 5 GS/s, paused for approximately 12.8 ns) or a few (e.g., 2-10) input samples, can be paused for 0.1-10 μs, 10-100 μs, 0.1-1 ms, or greater than 1 ms, can be paused for less than the duration of a single input sample, and/or can be paused for any other suitable duration. Additionally or alternatively, S230 can be performed without pausing the input data stream. For example, the input data stream can be sampled (or otherwise received), such as by electronically sampling a digital version of the input data stream, and used to determine (e.g., estimate, calculate exactly, etc.) the average expected output, such as by calculating and/or estimating the results of the desired operations and/or averages thereof. The average expected output can be determined electronically, can be determined photonically, such as using an additional filter bank (e.g., redundant filter bank, filter bank reserved for this purpose, filter bank not currently in use for primary computing functions, etc.), preferably a filter bank that has recently been assessed to have correct filter alignment and/or a filter bank with reduced temperature sensitivity, and/or can be determined in any other suitable manner.

S230 preferably includes controlling the shifter to reassign channels to different filters (e.g., based on the shift signal). For example, a barrel shifter can increment or decrement the index offset between the channel index and the filter index (e.g., the filter index minus the channel index, modulo the total number of indices). In such examples, the extremal filter that is assigned to a channel that rolls over to the other side of the filter indices (e.g., for an index-incrementing shift, the lowest-indexed filter (filter 1); for an index-decrementing shift, the highest-indexed filter) preferably filters the newly-assigned channel using a different resonance (e.g., 1 FSR away) than it used to filter the previously-assigned channel. However, such channel rollover can additionally or alternatively be handled in any other suitable manner.

In some embodiments, the index offset is incremented or decremented by a predefined integer value (preferably 1, but alternatively 2, 3, 4, 5-10, or more than 10) during each shift. The integer value is preferably determined based on the spacing between filter resonances (e.g., determined such that new channel assignments will result in filter control voltages near the center of the desired range, such as near zero applied voltage), but can additionally or alternatively be determined based on any other suitable information. In alternate embodiments, amount by which the index offset is changed is determined dynamically (e.g., determined such that the new channel assignments will result in filter control voltages near the center of the desired range, determined such that the new channel assignments are predicted to maximize the amount of time before another shift is needed, etc.). However, the amount by which the index offset is changed can additionally or alternatively be determined in any other suitable manner.

Additionally or alternatively, the feedback element can be controlled to move modulation to the opposite side of the resonance peak (e.g., for the same filter assignment, after assigning the channel to a different filter, etc.). However, the channels can additionally or alternatively be reassigned in any other suitable manner.

After channel reassignment, S230 preferably includes stabilizing filter control (e.g., at the feedback element). Stabilizing filter control preferably includes driving the filter to the target (e.g., the desired weight), such as by a PID process, preferably based on a known target value, such as a fixed value in embodiments in which the input data stream is paused, or a dynamically-determined value in embodiments in which the input data stream is not paused (e.g., calculated electronically and/or photonically, such as described above regarding photodetector-based shift criteria). In embodiments in which the target is a relative value, this is preferably performed based on the maximum amplitude for the channel (e.g., driving the filter to a fractional value of the maximum amplitude, wherein the fraction is equal to the desired weight).

Stabilizing filter control can optionally include (e.g., before driving the filter to the target) determining the resonance peak for the filter (e.g., finding the voltage at which channel modulation is maximized, finding the amplitude associated with this maximum point, etc.) for the new channel assignment. Alternatively, the peak amplitude can be assumed to be substantially unchanged (e.g., from the previous peak amplitude at this filter for a different channel, from the previous peak amplitude at a different filter for this channel, from the peak amplitude in a prior assignment in which this channel was assigned to this filter, etc.). If the resonance peak has not been determined for more than a threshold period of time and/or number of channel reassignments, the peak is preferably determined.

However, S230 can additionally or alternatively include shifting filter assignments in any other suitable manner.

2.4 Repetition.

The method 200 can optionally include repeating one or more of the elements described above, preferably including resuming S210 after S230 has been performed. For example, in response to stabilizing filter control, the method can include resuming S210 by providing a modulated WDM light input and performing photonic operations on that input. After resuming S210, the method 200 preferably includes repeating S220 (e.g., periodically and/or with any other suitable timing, such as described above) and/or S230 (e.g., in response to a determination in S220 that a shift is needed and/or desired, such as described above).

However, the method can additionally or alternatively include any other suitable elements performed in any suitable manner.

An alternative embodiment preferably implements the some or all of above methods in a computer-readable medium storing computer-readable instructions. The instructions are preferably executed by computer-executable components preferably integrated with a communication routing system. The communication routing system may include a communication system, routing system and a pricing system. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device.

Although omitted for conciseness, embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

The FIGURES illustrate the architecture, functionality and operation of possible implementations of systems, methods and computer program products according to preferred embodiments, example configurations, and variations thereof. In this regard, each block in the flowchart or block diagrams may represent a module, segment, step, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

We claim:

1. A method for spectral filter bank operation, the method comprising:
   determining channel assignments for a spectral filter bank, comprising:
      associating a first optical filter of the spectral filter bank with a first wavelength channel; and
      associating a second optical filter of the spectral filter bank with a second wavelength channel different from the first wavelength channel;
   throughout a first time period, controlling the spectral filter bank based on the channel assignments and a plurality of weights, comprising:
      based on a first weight of the plurality, determining a first control signal, wherein the first weight is substantially greater than 0 and substantially less than 1;
      based on a second weight of the plurality, determining a second control signal, wherein the second weight is different from the first weight;
      providing the first control signal to the first optical filter; and
      providing the second control signal to the second optical filter;
   receiving a series of optical input signals at the spectral filter bank, comprising:
      receiving a first subseries of the series during the first time period; and
      receiving a second subseries of the series during a second time period after the first time period;
   wherein each optical input signal of the series comprises:
      a respective first portion within the first wavelength channel; and
      a respective second portion within the second wavelength channel;
   during the first time period, for each optical input signal of the first subseries, in response to receiving the optical input signal at the input, filtering the optical input signal, comprising:
      at the first optical filter, filtering the respective first portion based on the first control signal; and
      at the second optical filter, filtering the respective second portion based on the second control signal;
   determining satisfaction of a filter assignment shift criterion;
   in response to determining satisfaction of the filter assignment shift criterion, determining shifted channel assignments for the spectral filter bank, comprising:
      associating the first optical filter with the second wavelength channel; and
      associating a third optical filter of the spectral filter bank with the first wavelength channel;
   in response to determining the shifted channel assignments, throughout the second time period, controlling the spectral filter bank based on the shifted channel assignments and the plurality of weights, comprising:
      based on the second weight, determining an updated first control signal;

based on the first weight, determining an updated third control signal;

providing the updated first control signal to the first optical filter; and providing the updated third control signal to the third optical filter; and during the second time period, for each optical input signal of the second subseries, in response to receiving the optical input signal at the input, filtering the optical input signal, comprising:

at the first optical filter, filtering the respective second portion based on the updated first control signal; and at the third optical filter, filtering the respective first portion based on the updated third control signal.

2. The method of claim 1, further comprising, at the spectral filter bank, for each optical input signal of the series, outputting a respective optical output signal, wherein:

for each respective optical input signal:

the respective first portion defines a respective first input intensity ($a_{1,i}$); and the respective second portion defines a respective second input intensity ($a_{2,i}$);

each respective optical output signal comprises:

a respective first output portion within the first wavelength channel, the respective first output portion defining a respective first output intensity ($y_{1,i}$); and a respective second output portion within the second wavelength channel, the respective second output portion defining a respective second output intensity ($y_{2,i}$); and for each optical input signal of the series, $y_{1,i}=a_{1,i}w_1$ and $y_{2,i}=a_{2,i}w_2$, wherein $w_1$ represents the first weight and $w_2$ represents the second weight.

3. The method of claim 2, wherein:

for each optical input signal of the first subseries:

the respective first portion is received by the first optical filter having an intensity substantially equal to the respective first input intensity and is output by the first optical filter having an intensity substantially equal to the respective first output intensity; and the respective second portion is received by the second optical filter having an intensity substantially equal to the respective second input intensity and is output by the second optical filter having an intensity substantially equal to the respective second output intensity; and for each optical input signal of the second subseries:

the respective first portion is received by the third optical filter having an intensity substantially equal to the respective first input intensity and is output by the third optical filter having an intensity substantially equal to the respective first output intensity; and the respective second portion is received by the first optical filter having an intensity substantially equal to the respective second input intensity and is output by the first optical filter having an intensity substantially equal to the respective second output intensity.

4. The method of claim 1, further comprising:

at the spectral filter bank, for each optical input signal of the series, outputting a respective optical output signal; and at an optical detector, for each optical input signal of the series:

receiving the respective optical output signal; and sampling a respective measurement indicative of a total intensity of the respective optical output signal.

5. A method for spectral filter bank operation, the method comprising:

determining channel assignments for a spectral filter bank, comprising:

associating a first optical filter of the spectral filter bank with a first wavelength channel; and associating a second optical filter of the spectral filter bank with a second wavelength channel different from the first wavelength channel;

controlling the spectral filter bank based on the channel assignments, comprising:

controlling the first optical filter to filter the first wavelength channel; and controlling the second optical filter to filter the second wavelength channel;

while controlling the spectral filter bank based on the channel assignments, at the spectral filter bank, filtering a first optical input signal, the first optical input signal comprising a first portion within the first wavelength channel and a second portion within the second wavelength channel, wherein the first optical filter filters the first portion and the second optical filter filters the second portion;

after filtering the first optical input signal, determining satisfaction of a filter assignment shift criterion;

determining shifted channel assignments for the spectral filter bank, comprising:

associating the first optical filter with the second wavelength channel; and associating a third optical filter of the spectral filter bank with the first wavelength channel;

in response to determining satisfaction of the filter assignment shift criterion, controlling the spectral filter bank based on the shifted channel assignments, comprising:

controlling the third optical filter to filter the first wavelength channel; and controlling the first optical filter to filter the second wavelength channel; and while controlling the spectral filter bank based on the shifted channel assignments, at the spectral filter bank, filtering a second optical input signal, the second optical input signal comprising a first portion within the first wavelength channel and a second portion within the second wavelength channel, wherein the third optical filter filters the first portion and the first optical filter filters the second portion;

wherein:

the channel assignments comprise a respective optical filter association for each wavelength channel of a plurality of wavelength channels, the plurality of wavelength channels comprising the first and second wavelength channels;

the wavelength channels of the plurality are non-overlapping;

the wavelength channels of the plurality are substantially equally spaced, wherein each pair of adjacent wavelength channels of the plurality define a channel spacing;

the spectral filter bank comprises a plurality of optical filters, the plurality of optical filters comprising the first, second, and third optical filters;

the channel assignments associate each wavelength channel of the plurality of wavelength channels with a different optical filter of the plurality of optical filters;

the shifted channel assignments associate each wavelength channel of the plurality of wavelength channels with a different optical filter of the plurality of optical filters;
controlling the spectral filter bank comprises, at a control module, for each optical filter of the plurality, independently adjusting a respective resonance wavelength of the optical filter; and
for each optical filter of the plurality, the control module is configured to adjust the respective resonance wavelength over a wavelength range at least 1.5 times wider than the channel spacing.

6. The method of claim 5, wherein:
the plurality of wavelength channels further comprises a last wavelength channel;
the plurality of wavelength channels defines a shortest wavelength and a longest wavelength, wherein the first wavelength channel comprises the shortest wavelength and the last wavelength channel comprises the longest wavelength;
the channel assignments associate the third optical filter of the spectral filter bank with the last wavelength channel;
controlling the spectral filter bank based on the channel assignments further comprises controlling the third optical filter to filter the last wavelength channel; and
the first optical input signal further comprises a last portion within the last wavelength channel, wherein the third optical filter filters the last portion.

7. The method of claim 6, wherein:
the plurality of wavelength channels consists of a number (n) of wavelength channels; and
a free spectral range of the third optical filter is between $n\Delta\lambda$ and $(n+2)\Delta\lambda$, wherein $\Delta\lambda$ represents the channel spacing.

8. The method of claim 6, wherein:
the shifted channel assignments associate the second optical filter of the spectral filter bank with a third wavelength channel of the plurality;
controlling the spectral filter bank based on the shifted channel assignments further comprises controlling the second optical filter to filter the third wavelength channel; and
the second optical input signal further comprises a third portion within the third wavelength channel, wherein the second optical filter filters the third portion.

9. The method of claim 8, wherein the third wavelength channel is not the last wavelength channel.

10. The method of claim 5, wherein:
while filtering the first optical input signal:
the second and third optical filters do not substantially filter the first wavelength channel; and
the first and third optical filters do not substantially filter the second wavelength channel; and
while filtering the second optical input signal:
the first and second optical filters do not substantially filter the first wavelength channel; and
the second and third optical filters do not substantially filter the second wavelength channel.

11. The method of claim 5, wherein each optical filter of the plurality comprises a respective microresonator.

12. The method of claim 11, wherein:
the plurality of wavelength channels defines an average channel spacing between each pair of adjacent wavelength channels of the plurality;

for each optical filter of the plurality, the respective microresonator defines a respective equilibrium resonance wavelength; and
the respective equilibrium resonance wavelengths define an average resonance spacing between each pair of adjacent equilibrium resonance wavelengths, wherein the average resonance spacing is substantially equal to the average channel spacing.

13. The method of claim 5, wherein:
for each optical filter of the plurality, independently adjusting the respective resonance wavelength comprises independently applying a respective electrical control signal to the optical filter; and
determining satisfaction of the filter assignment shift criterion comprises determining that at least one of the electrical control signals is outside a threshold range.

14. The method of claim 5, wherein determining satisfaction of the filter assignment shift criterion comprises determining that a change in spectral filter bank temperature exceeds a threshold temperature difference.

15. The method of claim 5, further comprising:
after filtering the second optical input signal, determining satisfaction of a second filter assignment shift criterion;
determining re-shifted channel assignments for the spectral filter bank, comprising:
associating the third optical filter with the second wavelength channel; and
associating a fourth optical filter of the spectral filter bank with the first wavelength channel;
in response to determining satisfaction of the second filter assignment shift criterion, controlling the spectral filter bank based on the re-shifted channel assignments, comprising:
controlling the fourth optical filter to filter the first wavelength channel; and
controlling the third optical filter to filter the second wavelength channel; and
while controlling the spectral filter bank based on the re-shifted channel assignments, at the spectral filter bank, filtering a third optical input signal, the third optical input signal comprising a first portion within the first wavelength channel and a second portion within the second wavelength channel, wherein the fourth optical filter filters the first portion and the third optical filter filters the second portion.

16. A method for spectral filter bank operation, the method comprising:
determining channel assignments for a spectral filter bank, comprising:
associating a first optical filter of the spectral filter bank with a first wavelength channel; and
associating a second optical filter of the spectral filter bank with a second wavelength channel different from the first wavelength channel;
controlling the spectral filter bank based on the channel assignments, comprising:
controlling the first optical filter to filter the first wavelength channel; and
controlling the second optical filter to filter the second wavelength channel;
while controlling the spectral filter bank based on the channel assignments, at the spectral filter bank, filtering a first optical input signal, the first optical input signal comprising a first portion within the first wavelength channel and a second portion within the second wavelength channel, wherein the first optical filter filters the first portion and the second optical filter filters the second portion;

after filtering the first optical input signal, determining satisfaction of a filter assignment shift criterion;

determining shifted channel assignments for the spectral filter bank, comprising:
    associating the first optical filter with the second wavelength channel; and
    associating a third optical filter of the spectral filter bank with the first wavelength channel;

in response to determining satisfaction of the filter assignment shift criterion, controlling the spectral filter bank based on the shifted channel assignments, comprising:
    controlling the third optical filter to filter the first wavelength channel; and
    controlling the first optical filter to filter the second wavelength channel; and while controlling the spectral filter bank based on the shifted channel assignments, at the spectral filter bank, filtering a second optical input signal, the second optical input signal comprising a first portion within the first wavelength channel and a second portion within the second wavelength channel, wherein the third optical filter filters the first portion and the first optical filter filters the second portion;

after filtering the second optical input signal, determining satisfaction of a reverse filter assignment shift criterion;

in response to determining satisfaction of the reverse filter assignment shift criterion, controlling the spectral filter bank based on the channel assignments, comprising:
    controlling the first optical filter to filter the first wavelength channel; and
    controlling the second optical filter to filter the second wavelength channel; and while controlling the spectral filter bank based on the channel assignments in response to determining satisfaction of the reverse filter assignment shift criterion, at the spectral filter bank, filtering a third optical input signal, the third optical input signal comprising a first portion within the first wavelength channel and a second portion within the second wavelength channel, wherein the first optical filter filters the first portion and the second optical filter filters the second portion.

17. The method of claim 16, wherein:

the spectral filter bank comprises a plurality of optical filters, the plurality of optical filters comprising the first, second, and third optical filters;

controlling the spectral filter bank based on the channel assignments comprises, for each optical filter of the plurality, independently providing a respective control signal to the optical filter;

determining satisfaction of the filter assignment shift criterion comprises determining that a first control signal of the respective control signals is greater than an upper threshold value; and determining satisfaction of the reverse filter assignment shift criterion comprises determining that a second control signal of the respective control signals is less than a lower threshold value, wherein the upper threshold value is greater than the lower threshold value.

\* \* \* \* \*